US012160518B2

(12) United States Patent
Lee et al.

(10) Patent No.: US 12,160,518 B2
(45) Date of Patent: Dec. 3, 2024

(54) SYSTEM INFORMATION PROTECTION AT A NETWORK FUNCTION IN THE CORE NETWORK

(71) Applicant: QUALCOMM Incorporated, San Diego, CA (US)

(72) Inventors: Soo Bum Lee, San Diego, CA (US); Gavin Bernard Horn, La Jolla, CA (US); Ravi Agarwal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 197 days.

(21) Appl. No.: 17/066,014

(22) Filed: Oct. 8, 2020

(65) Prior Publication Data

US 2021/0111902 A1 Apr. 15, 2021

Related U.S. Application Data

(60) Provisional application No. 62/914,335, filed on Oct. 11, 2019.

(51) Int. Cl.
*H04M 1/66* (2006.01)
*H04L 9/30* (2006.01)
(Continued)

(52) U.S. Cl.
CPC .............. *H04L 9/3247* (2013.01); *H04L 9/30* (2013.01); *H04W 8/08* (2013.01); *H04W 48/10* (2013.01)

(58) Field of Classification Search
CPC .......... H04L 9/3247; H04L 9/30; H04W 8/08; H04W 48/10
See application file for complete search history.

(56) References Cited

U.S. PATENT DOCUMENTS 5,138,712 A * 8/1992 Corbin ................ H04L 63/0807
717/176
5,674,003 A * 10/1997 Andersen .............. H04M 3/567
709/204
(Continued)

FOREIGN PATENT DOCUMENTS

CN 102611554 A 7/2012
TW 201735695 A 10/2017
(Continued)

OTHER PUBLICATIONS

International Search Report and Written Opinion—PCT/US2020/055021—ISA/EPO—Dec. 17, 2020.
(Continued)

*Primary Examiner* — Stephen M D Agosta
(74) *Attorney, Agent, or Firm* — Holland & Hart LLP

(57) ABSTRACT

Methods, systems, and devices for wireless communications are described. Private keys may be maintained upstream in a network at a more secure location. For example, when a signature is needed, a base station may transmit a signing request to a signing function within the core network and may transmit system information (SI) to be protected. The signing function may use a private key to generate a signature for the SI and returns the signature to the base station. The base station may transmit the SI and the signature to user equipment (UEs) within a coverage area of the base station. The UEs may obtain a public key corresponding to the private key and may use the public key to verify that the signature for the SI is valid and from the base station. The public key, and hence the signature, may correspond to a particular tracking area.

8 Claims, 23 Drawing Sheets

(51) Int. Cl.
  *H04L 9/32* (2006.01)
  *H04M 1/68* (2006.01)
  *H04M 3/16* (2006.01)
  *H04W 8/08* (2009.01)
  *H04W 48/10* (2009.01)

(56) References Cited

U.S. PATENT DOCUMENTS

| | | | | |
|---|---|---|---|---|
| 6,243,467 | B1* | 6/2001 | Reiter | G06F 7/725 |
| | | | | 713/180 |
| 6,775,771 | B1* | 8/2004 | Shrader | G06F 21/64 |
| | | | | 713/156 |
| 7,024,559 | B1* | 4/2006 | Solinas | H04L 9/3066 |
| | | | | 713/180 |
| 7,840,812 | B1* | 11/2010 | Levenberg | H04L 63/0823 |
| | | | | 713/176 |
| 10,200,862 | B2* | 2/2019 | Nair | H04W 12/04 |
| 11,070,981 | B2* | 7/2021 | Lee | H04W 12/03 |
| 11,082,853 | B2* | 8/2021 | Vivanco | H04W 48/04 |
| 11,178,547 | B2* | 11/2021 | Yang | H04L 9/3247 |
| 2002/0146125 | A1* | 10/2002 | Eskicioglu | H04N 7/1675 |
| | | | | 348/E7.063 |
| 2003/0031455 | A1* | 2/2003 | Sagar | H04N 21/4325 |
| | | | | 386/E5.043 |
| 2003/0158823 | A1* | 8/2003 | Fulton | H04L 9/3247 |
| | | | | 705/75 |
| 2003/0177361 | A1* | 9/2003 | Wheeler | G06Q 20/00 |
| | | | | 713/176 |
| 2004/0125959 | A1* | 7/2004 | Beuque | H04N 7/1675 |
| | | | | 713/168 |
| 2005/0114270 | A1* | 5/2005 | Hind | G06Q 30/00 |
| | | | | 705/64 |
| 2005/0157881 | A1* | 7/2005 | Van Someren | G06Q 20/40975 |
| | | | | 380/286 |
| 2006/0218391 | A1* | 9/2006 | Glazer | H04L 63/1483 |
| | | | | 713/152 |
| 2007/0186098 | A1* | 8/2007 | Lingmann | H04L 63/20 |
| | | | | 713/158 |
| 2008/0293419 | A1* | 11/2008 | Somasundaram | |
| | | | | H04M 15/8033 |
| | | | | 455/437 |
| 2009/0077373 | A1* | 3/2009 | Kramer | H04L 9/321 |
| | | | | 713/176 |
| 2010/0278093 | A1* | 11/2010 | Wang | H04W 72/30 |
| | | | | 370/312 |
| 2011/0263282 | A1* | 10/2011 | Rune | H04J 11/0093 |
| | | | | 455/507 |
| 2013/0294374 | A1 | 11/2013 | Li et al. | |
| 2015/0004925 | A1* | 1/2015 | Suh | H04W 12/10 |
| | | | | 455/404.1 |
| 2015/0382192 | A1* | 12/2015 | Guillaume | H04W 12/06 |
| | | | | 455/411 |
| 2016/0381630 | A1* | 12/2016 | Krishnamoorthy | H04W 24/10 |
| | | | | 370/329 |
| 2017/0027008 | A1* | 1/2017 | Krishnamoorthy | |
| | | | | H04L 67/1072 |
| 2017/0126411 | A1* | 5/2017 | Piqueras Jover | H04W 12/04 |
| 2017/0295489 | A1* | 10/2017 | Agiwal | H04W 12/0433 |
| 2018/0124602 | A1* | 5/2018 | Nair | H04W 12/06 |
| 2018/0124696 | A1* | 5/2018 | Nair | H04W 12/04 |
| 2018/0124697 | A1* | 5/2018 | Nair | H04W 12/122 |
| 2018/0367303 | A1* | 12/2018 | Velev | H04L 9/0891 |
| 2019/0349765 | A1* | 11/2019 | Kolekar | H04W 12/068 |
| 2020/0021993 | A1* | 1/2020 | Yang | H04W 72/23 |
| 2020/0145211 | A1* | 5/2020 | Lee | H04L 9/0825 |
| 2020/0145821 | A1* | 5/2020 | Lee | H04W 12/037 |
| 2021/0235264 | A1* | 7/2021 | Kolekar | H04W 12/04 |
| 2021/0243777 | A1* | 8/2021 | Tsai | H04W 74/006 |
| 2022/0248223 | A1* | 8/2022 | Tsutsui | H04W 12/75 |

FOREIGN PATENT DOCUMENTS

| | | |
|---|---|---|
| WO | 2017176068 A1 | 10/2017 |
| WO | 2019088599 A1 | 5/2019 |

OTHER PUBLICATIONS

Nokia, et al., "Updates to Solution#7 on Verification of Authenticity of the cell", 3GPP Draft; 3GPP TSG-SA WG3 Meeting #96, S3-192585 FBS Add Text to Evaluation Clause 6.7.3, 3rd Generation Partnership Project (3GPP), Mobile Competence Centre; 650, Route Des Lucioles; F-06921 Sophia-Antipolis Cedex; France, vol. SA WG3, No. Wroclaw (Poland); Aug. 26, 2019-Aug. 30, 2019, Aug. 19, 2019 (Aug. 19, 2019), XP051776425, 7 Pages, Retrieved from the Internet: URL: http://www.3gpp.org/ftp/tsg_sa/WG3_Security/TSGS3_96_Wroclaw/Docs/S3-192585.zip, [retrieved on Aug. 19, 2019], p. 1-p. 5; figures 6.7.2.2.1-2.

Samsung: "Resolving Editor's Note on Provisioning of Public Keys to the UE", 3GPP Draft; 3GPP TSG SA WG3 (Security) Adhoc Meeting on FS_NSA, S3-161424-Radiosecpub, 3rd Generation Partnership Project (3GPP), Mobile Competence Centre; 650, Route Des Lucioles; F-06921 Sophia-Antipolis Cedex; France, vol. SA WG3, No. San Diego, USA; Sep. 27, 2016-Sep. 29, 2016, Sep. 20, 2016 (Sep. 20, 2016), XP051170381, 3 Pages, Retrieved from the Internet: URL: http://www.3gpp.org/ftp/tsg_sa/WG3_Security/TSGS3_84b_San_Diego/Docs/ [retrieved on Sep. 20, 2016], p. 1-p. 3; figures 5.4.4.2.2.1-1.

Taiwan Search Report—TW109135213—TIPO—Apr. 10, 2024.

* cited by examiner

SYSTEM INFORMATION PROTECTION AT A NETWORK FUNCTION IN THE CORE NETWORK

CROSS REFERENCE

The present Application for Patent claims the benefit of U.S. Provisional Patent Application No. 62/914,335 by LEE et al., entitled "SYSTEM INFORMATION PROTECTION AT A NETWORK FUNCTION IN THE CORE NETWORK," filed Oct. 11, 2019, assigned to the assignee hereof, and expressly incorporated by reference herein.

FIELD OF TECHNOLOGY

The following relates generally to wireless communications and more specifically to system information (SI) protection at a network function (NF) in the core network.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communication systems, a network entity may utilize one or more security keys to facilitate secure communications across the network (e.g., between a UE and a base station). A security key may be derived from a number of parameters or key derivation functions (KDFs). Prior to establishing and using the security keys, system information (SI) may be transmitted from a base station to a UE to provide the UE with information about the system and the base station to enable subsequent communications (e.g., such as the signaling to establish a connection for the secure communications). However, this SI may not be protected when transmitted to the UE (e.g., the SI is unencrypted), allowing an opportunity for an attacker to act as the base station and provide false information to the UE, impacting the ability of the UE to establish a connection with the network (e.g., as part of a denial of service (DoS) attack).

SUMMARY

The described techniques relate to improved methods, systems, devices, and apparatuses that support system information (SI) protection at a network function (NF) in the core network. Generally, the described techniques provide for storing private key-public key pairs at a network node (e.g., at a signing NF virtually implemented in software in the core network) that a user equipment (UE) can use to verify a signature of a SI message (e.g., an SI block (SIB), security SIB, master information block (MIB), etc.) that has been transmitted by a base station. In some cases, the base station may transmit a signature request to the network node (e.g., a core network node) including the SI and may receive a signature response from the network node that includes a signature that was generated based on the SI (e.g., corresponding to the public key-private key pair). Subsequently, the base station may transmit the SI message (e.g., via a broadcasted message) that includes the SI and the generated signature. Prior to receiving the SI message, the UE may be provisioned with one or more public keys generated by the network node via an access and mobility management function (AMF) when registering with the network. Accordingly, when an SI message is detected and received at the UE, the UE may use the provisioned public keys to verify the signature and determine that the received SI message was transmitted by the base station (e.g., and not a hacker, attacker, false base station, etc.).

In some cases, the base station may transmit a bulk signature request to the network node requesting a number of signatures for a given time (e.g., time based signatures). Additionally or alternatively, the bulk signature request may include a freshness parameter (e.g., recency parameter, system frame number (SFN), etc.), where the signatures are generated at the network node based on the freshness parameter (e.g., signatures are provided based on requested SFNs). In some cases, the base station may continually receive updated signatures from the network node or may request new signatures when SI messages are changed at the base station. Additionally, the public keys may include a key identifier (ID) that corresponds to a tracking area (e.g., a geographic area for the network where the public key is valid). As such, the network node may provide tuples of the key ID and the corresponding public key to the UE when the UE registers with the network (e.g., via a registration accept message) to enable the UE to verify the SI message and signature broadcasted by the base station along with the key ID. Accordingly, the signature messages provided to the base station (e.g., by the network node, a core network node, a signing NF, etc.) may also carry the key ID to enable the base station to broadcast the key ID along with the SI message and signature. In some cases, an AMF may be provisioned multiple public keys corresponding to neighboring tracking areas such that if the UE enters a new tracking area, the UE may verify an SI message without having to receive new public keys.

A method of wireless communications by a base station is described. The method may include transmitting, to a network node, a signature request that includes SI, receiving, from the network node, a signature response that includes a signature generated based on the SI, and transmitting an SI message that includes the SI and the signature.

An apparatus for wireless communications by a base station is described. The apparatus may include a processor, memory coupled with the processor, and instructions stored in the memory. The instructions may be executable by the processor to cause the apparatus to transmit, to a network node, a signature request that includes SI, receive, from the network node, a signature response that includes a signature generated based on the SI, and transmit an SI message that includes the SI and the signature.

Another apparatus for wireless communications by a base station is described. The apparatus may include means for transmitting, to a network node, a signature request that includes SI, receiving, from the network node, a signature response that includes a signature generated based on the SI, and transmitting an SI message that includes the SI and the signature.

A non-transitory computer-readable medium storing code for wireless communications by a base station is described. The code may include instructions executable by a processor to transmit, to a network node, a signature request that includes SI, receive, from the network node, a signature response that includes a signature generated based on the SI, and transmit an SI message that includes the SI and the signature.

In some examples of the method, apparatuses, and non-transitory computer-readable medium described herein, transmitting the signature request may include operations, features, means, or instructions for transmitting the signature request that includes the SI and master information, where the signature may be generated based on the SI and the master information.

Some examples of the method, apparatuses, and non-transitory computer-readable medium described herein may further include operations, features, means, or instructions for transmitting the SI message that indicates an ID of a public key corresponding to a first private key used to generate the signature.

Some examples of the method, apparatuses, and non-transitory computer-readable medium described herein may further include operations, features, means, or instructions for transmitting, to the network node, a second signature request that includes updated SI, receiving, from the network node, a signature response that includes a second signature generated based on the updated SI, and transmitting an SI message that includes the updated SI and the second signature.

Some examples of the method, apparatuses, and non-transitory computer-readable medium described herein may further include operations, features, means, or instructions for receiving a registration request from a UE, transmitting the registration request to a network node that provide an AMF, receiving, from the network node, a registration response that includes a first public key corresponding to a first private key used to generate the signature, and transmitting the registration response to the UE.

In some examples of the method, apparatuses, and non-transitory computer-readable medium described herein, transmitting the registration response may include operations, features, means, or instructions for transmitting the registration response that includes a first tracking area for the first public key.

In some examples of the method, apparatuses, and non-transitory computer-readable medium described herein, transmitting the registration response may include operations, features, means, or instructions for transmitting the registration response that indicates a second public key for a second tracking area that may be geolocated relative to the first tracking area, the second public key corresponding to a second private key used to generate a second signature for second SI transmitted within the second tracking area.

In some examples of the method, apparatuses, and non-transitory computer-readable medium described herein, receiving the registration request may include operations, features, means, or instructions for receiving a mobility registration update request from a UE indicating that the UE may have entered a new tracking area.

In some examples of the method, apparatuses, and non-transitory computer-readable medium described herein, transmitting the signature request may include operations, features, means, or instructions for transmitting the signature request to request a set of signatures for a time range and a time increment interval.

In some examples of the method, apparatuses, and non-transitory computer-readable medium described herein, receiving the signature response may include operations, features, means, or instructions for receiving the signature response that includes the set of signatures.

In some examples of the method, apparatuses, and non-transitory computer-readable medium described herein, receiving the signature response may include operations, features, means, or instructions for receiving a set of signature responses that each includes a subset of one or more of the set of signatures. In some examples of the method, apparatuses, and non-transitory computer-readable medium described herein, each of the subsets corresponds to a respective time increment interval within the time range.

In some examples of the method, apparatuses, and non-transitory computer-readable medium described herein, transmitting the signature request may include operations, features, means, or instructions for transmitting the signature request that indicates a subframe increment interval and requests a set of signatures corresponding to a subframe number range between a beginning subframe number and an ending subframe number.

In some examples of the method, apparatuses, and non-transitory computer-readable medium described herein, receiving the signature response may include operations, features, means, or instructions for receiving the signature response that includes the set of signatures.

In some examples of the method, apparatuses, and non-transitory computer-readable medium described herein, receiving the signature response may include operations, features, means, or instructions for receiving a set of signature responses that each includes a subset of one or more of the set of signatures. In some examples of the method, apparatuses, and non-transitory computer-readable medium described herein, each of the subsets corresponds to a respective subframe increment interval within the subframe number range.

In some examples of the method, apparatuses, and non-transitory computer-readable medium described herein, transmitting the signature request may include operations, features, means, or instructions for transmitting the signature request that includes a recency parameter.

Some examples of the method, apparatuses, and non-transitory computer-readable medium described herein may further include operations, features, means, or instructions for receiving, from the network node, the signature response that includes the signature that may be generated based on the SI and the recency parameter. In some examples of the method, apparatuses, and non-transitory computer-readable medium described herein, the recency parameter may be an SFN.

A method of wireless communications by a network node is described. The method may include receiving, from a base station, a signature request that includes SI and transmitting, to the base station, a signature response that includes a signature generated based on the SI.

An apparatus for wireless communications by a network node is described. The apparatus may include a processor, memory coupled with the processor, and instructions stored in the memory. The instructions may be executable by the processor to cause the apparatus to receive, from a base station, a signature request that includes SI and transmit, to the base station, a signature response that includes a signature generated based on the SI.

Another apparatus for wireless communications by a network node is described. The apparatus may include means for receiving, from a base station, a signature request that includes SI and transmitting, to the base station, a signature response that includes a signature generated based on the SI.

A non-transitory computer-readable medium storing code for wireless communications by a network node is described. The code may include instructions executable by a processor to receive, from a base station, a signature request that includes SI and transmit, to the base station, a signature response that includes a signature generated based on the SI.

In some examples of the method, apparatuses, and non-transitory computer-readable medium described herein, receiving the signature request may include operations, features, means, or instructions for receiving the signature request that includes the SI and master information, where the signature may be generated based on the SI and the master information.

Some examples of the method, apparatuses, and non-transitory computer-readable medium described herein may further include operations, features, means, or instructions for transmitting a key ID message that indicates an ID of a public key corresponding to a first private key used to generate the signature.

Some examples of the method, apparatuses, and non-transitory computer-readable medium described herein may further include operations, features, means, or instructions for receiving, from the base station, a second signature request that includes updated SI, and transmitting, to the base station, a signature response that includes a second signature generated based on the updated SI.

In some examples of the method, apparatuses, and non-transitory computer-readable medium described herein, receiving the signature request may include operations, features, means, or instructions for receiving the signature request that requests a set of signatures for a time range and a time increment interval.

In some examples of the method, apparatuses, and non-transitory computer-readable medium described herein, transmitting the signature response may include operations, features, means, or instructions for transmitting the signature response that includes the set of signatures. In some examples of the method, apparatuses, and non-transitory computer-readable medium described herein, transmitting the signature response may include operations, features, means, or instructions for transmitting a set of signature responses that each includes a subset of one or more of the set of signatures. In some examples of the method, apparatuses, and non-transitory computer-readable medium described herein, each of the subsets corresponds to a respective time increment interval within the time range.

In some examples of the method, apparatuses, and non-transitory computer-readable medium described herein, receiving the signature request may include operations, features, means, or instructions for receiving the signature request that indicates a subframe increment interval and requests a set of signatures corresponding to a subframe number range between a beginning subframe number and an ending subframe number.

In some examples of the method, apparatuses, and non-transitory computer-readable medium described herein, receiving the signature response may include operations, features, means, or instructions for receiving the signature response that includes the set of signatures. In some examples of the method, apparatuses, and non-transitory computer-readable medium described herein, receiving the signature response may include operations, features, means, or instructions for receiving a set of signature responses that each includes a subset of one or more of the set of signatures. In some examples of the method, apparatuses, and non-transitory computer-readable medium described herein, each of the subsets corresponds to a respective subframe increment interval within the subframe number range.

In some examples of the method, apparatuses, and non-transitory computer-readable medium described herein, receiving the signature request may include operations, features, means, or instructions for receiving the signature request that includes a recency parameter.

Some examples of the method, apparatuses, and non-transitory computer-readable medium described herein may further include operations, features, means, or instructions for transmitting, to the base station, the signature response that includes the signature that may be generated based on the SI and the recency parameter. In some examples of the method, apparatuses, and non-transitory computer-readable medium described herein, the recency parameter may be an SFN.

A method of wireless communications by a UE is described. The method may include transmitting a registration request to a core network node, receiving, from the core network node, a registration response that includes a first public key corresponding to a first private key used to generate a first signature for first SI for a first tracking area and a second public key corresponding to a second private key used to generate a second signature for second SI for a second tracking area that is geolocated relative to the first tracking area, and monitoring for an SI message that includes the first SI and the first signature or includes the second SI and the second signature.

An apparatus for wireless communications by a UE is described. The apparatus may include a processor, memory coupled with the processor, and instructions stored in the memory. The instructions may be executable by the processor to cause the apparatus to transmit a registration request to a core network node, receive, from the core network node, a registration response that includes a first public key corresponding to a first private key used to generate a first signature for first SI for a first tracking area and a second public key corresponding to a second private key used to generate a second signature for second SI for a second tracking area that is geolocated relative to the first tracking area, and monitor for an SI message that includes the first SI and the first signature or includes the second SI and the second signature.

Another apparatus for wireless communications by a UE is described. The apparatus may include means for transmitting a registration request to a core network node, receiving, from the core network node, a registration response that includes a first public key corresponding to a first private key used to generate a first signature for first SI for a first tracking area and a second public key corresponding to a second private key used to generate a second signature for second SI for a second tracking area that is geolocated relative to the first tracking area, and monitoring for an SI message that includes the first SI and the first signature or includes the second SI and the second signature.

A non-transitory computer-readable medium storing code for wireless communications by a UE is described. The code may include instructions executable by a processor to transmit a registration request to a core network node, receive, from the core network node, a registration response that includes a first public key corresponding to a first private key used to generate a first signature for first SI for a first tracking area and a second public key corresponding to a second private key used to generate a second signature for second SI for a second tracking area that is geolocated relative to the first tracking area, and monitor for an SI message that includes the first SI and the first signature or includes the second SI and the second signature.

In some examples of the method, apparatuses, and non-transitory computer-readable medium described herein, monitoring for the SI message may include operations, features, means, or instructions for receiving the SI message that includes the first SI and the first signature.

Some examples of the method, apparatuses, and non-transitory computer-readable medium described herein may further include operations, features, means, or instructions for verifying the first SI based on the first signature, and establishing connectivity with a base station within the first tracking area based on the verified first SI.

In some examples of the method, apparatuses, and non-transitory computer-readable medium described herein, monitoring for the SI message may include operations, features, means, or instructions for receiving the SI message that includes the second SI and the second signature.

Some examples of the method, apparatuses, and non-transitory computer-readable medium described herein may further include operations, features, means, or instructions for verifying the second SI based on the second signature, and establishing connectivity with a base station within the second tracking area based on the verified second SI.

In some examples of the method, apparatuses, and non-transitory computer-readable medium described herein, monitoring for the SI message may include operations, features, means, or instructions for receiving the SI message that indicates an ID of the first public key corresponding to the first private key used to generate the first signature.

In some examples of the method, apparatuses, and non-transitory computer-readable medium described herein, transmitting the registration request may include operations, features, means, or instructions for transmitting a mobility registration update request indicating that the UE may have moved from the first tracking area to the second tracking area.

DETAILED DESCRIPTION

In wireless communications systems, a base station may transmit a system information block (SIB) that contains information permitting a UE to establish connectivity with the base station. The SIB conventionally has not been encrypted. An attacker potentially may alter system information (SI) in the SIB as part of a denial of service (DoS) attack. In some cases, a private key can be distributed to base stations and used to generate a digital signature for the SIB. However, there are many base stations, and hackers have found ways to steal private keys from the base stations.

As described herein, private keys may be maintained upstream in the network at a more secure location. For example, when a signature is needed, a base station may transmit a signing request to a signing function within the core network and may transmit an SI to be protected. The signing function may use a private key to generate a signature for the SI and return the signature to the base station. The base station transmits the SI and the signature to UEs within a coverage area of the base station (e.g., via a broadcast transmission). The UEs may obtain a public key corresponding to the private key and may use the public key to verify that the signature for the SIB is valid and from the base station (e.g., otherwise the SIB is discarded). The public key, and hence the signature, may correspond to a particular tracking area, and the network may provide the UE with multiple public keys for neighboring tracking areas. When a UE moves from one tracking area to a neighboring tracking area, the UE attempts to verify the signature of an SIB for that tracking area. If verified, the UE may attempt to establish connectivity with a base station in the neighboring tracking area using the verified SIB.

Aspects of the disclosure are initially described in the context of wireless communications systems. Additionally, aspects of the disclosure are illustrated through a cell authentication and a process flow. Aspects of the disclosure are further illustrated by and described with reference to apparatus diagrams, system diagrams, and flowcharts that relate to SI protection at an NF in the core network.

Figure 1:
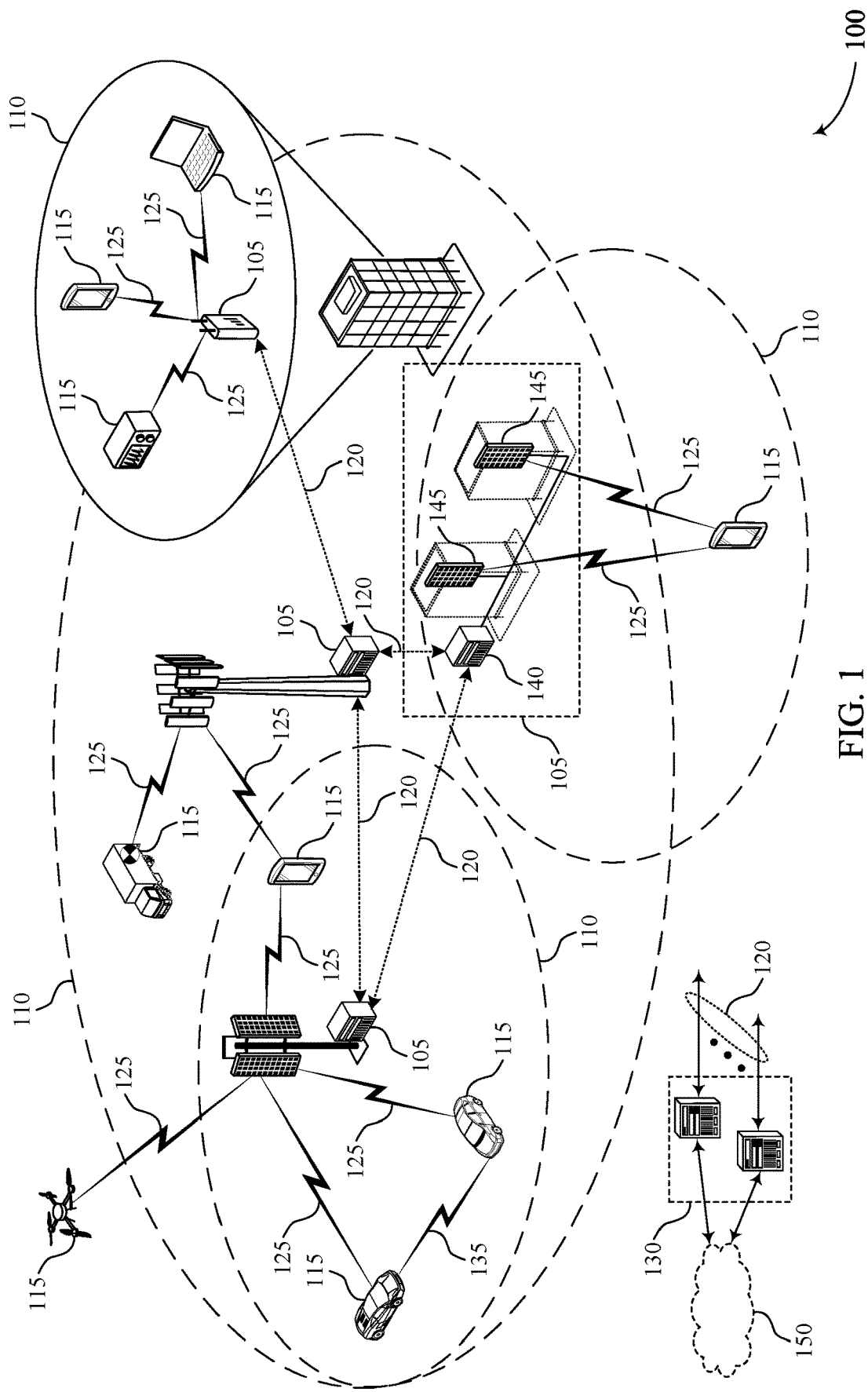
FIG. 1 illustrates an example of a system for wireless communications that supports system information (SI) protection at a network function (NF) in the core network in accordance with aspects of the present disclosure.

FIG. 1 illustrates an example of a wireless communications system 100 that supports SI protection at an NF in the core network in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $\Delta N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The core network 130 may include several entities (e.g., functions) such as AMFs, session management functions (SMFs), user plane functions (UPFs), NFs, and others. One or more of the entities of the core network may be virtually implemented in software. In some examples, the UEs 115 and base stations 105 may communicate with an entity of the core network 130 (e.g., an MME or AMF) to establish a secure connection for communications. The AMF may provide access and mobility management services for the UEs 115 and base stations 105. In some examples, the AMF may serve as the primary point of control plane signaling communications with the UEs 115 and base stations 105, such that a majority of control plane communications between the UEs 115, base stations 105, and the core network 130 pass through the AMF.

In some examples, a UE 115 may initiate a connection process with the base station 105 by sending an attach request. Based on the attach request, the base station 105 may facilitate authentication and/or authorization of the UE 115 through a core network 130 (e.g., via one or more entities of the core network 130). Once authenticated, the UE 115 may communicate with the core network 130 based on a non-access stratum (NAS) protocol configured to securely establish and maintain connectivity between the UE 115 and the core network 130. One or more core network nodes (e.g., an AMF, a MME, serving gateway, etc.) may inform the base station 105 that the UE 115 is authenticated and authorized to connect to the wireless communications system 100. Thereafter, the base station 105 may establish a radio resource control (RRC) (e.g., higher layer) connection with the UE 115 (e.g., based on an AS protocol).

To establish an RRC connection, the base station 105 may generate and transmit a security configuration to the UE 115 during the execution of an access stratum (AS) protocol or after the AS protocol has been performed. In some examples, the security configuration may be transmitted to the UE 115 over a secure radio channel (e.g., a secure RRC channel), which may be established based at least in part on a shared key associated with the base station 105 and the UE 115. In some examples, the shared key may be a gNB key (e.g., $K_{gNB}$) or an eNB key ($K_{eNB}$), which may be transmitted to the base station 105 by a core network node (e.g., during or subsequent to the authentication and key agreement (AKA) process) and/or derived by the UE 115.

The base station 105 may then generate an encoded message that includes an allocation of resources and in particular, a shared pattern of resources allocated for uplink control information for the UE 115. In one example, the encoded message may be encrypted based on the shared key and provided to the UE 115 over a secure RRC channel. In another example, the encoded message may be encrypted in a physical downlink control channel (PDCCH) message. The encrypted PDCCH message may be encrypted using an encryption key (e.g., public key). The encryption key may be transmitted from the base station 105 to the UE 115 during the RRC connection and/or may be transmitted over a secure RRC channel (e.g., after an RRC connection is established). Using the secure RRC channel may prevent other devices, such as a jamming device, from intercepting the encryption key. In some examples, the encryption key may be common to all UEs 115 connected to or attempting to connect to the base station 105. In some cases, the encryption key may be randomly generated by the base station 105 or the core network 130. In some examples, the encryption key may be derived based on a shared key associated with the base station 105 and the UE 115, such as a $K_{gNB}$ (or $K_{eNB}$).

In some wireless communications systems 100 (e.g., LTE), a home subscriber server (HSS) may generate an access security management entity (ASME) key (e.g., $K_{ASME}$) and signal it to an MME. An initial $K_{eNB}$ may then be derived by the MME utilizing the $K_{ASME}$. A subsequent $K_{eNB}$ may be derived from a next hop (NH) key, where the NH key may be derived from the $K_{ASME}$ and the previous NH key or from the $K_{ASME}$ and the $K_{eNB}$ for an initial NH key derivation. For deriving the different keys (e.g., $K_{eNB}$, NH keys, integrity check keys, ciphering keys, etc.), a UE 115, base station 105, or MME may utilize key derivation functions (KDFs), where each KDF may include certain parameters of an input, S, such as a function code (FC), a parameter 0 (P0), a length of parameter 0 (L0), a parameter 1 (P1), a length of parameter 1 (L1), etc.

In some examples, when deriving the $K_{eNB}$ from the $K_{ASME}$ with an uplink NAS COUNT in a UE 115 and MME, the KDF parameters may consist of an FC value of 0x11, a P0 value equal to the uplink NAS COUNT, and an L0 value equal to the length of the uplink NAS COUNT (e.g., 0x00 0x04). Additionally, the UE 115 and MME may utilize the 256-bit $K_{ASME}$ as the input key. The UE 115 and MME may apply this KDF when establishing cryptographically protected Evolved Universal Mobile Telecommunications System Terrestrial Radio Access Network (E-UTRAN) radio bearers and/or when performing a key change on-the-fly.

In some examples, when deriving the NH key from the $K_{ASME}$, the KDF parameters may consist of an FC value of 0x12, a P0 value equal to a SYNC-input, and a L0 value equal to the length of the SYNC-input (e.g., 0x00 0x20). The SYNC-input parameter may be the newly derived $K_{eNB}$ for the initial NH key derivation or the previous NH key for subsequent NH key derivations. Through this SYNC-input parameter, an NH chain may be formed such that the next NH key may be fresh and derived from the previous NH key. Additionally, the UE 115 and MME may utilize the 256-bit $K_{ASME}$ as the input key.

Prior to establishing the secure connection as described above (e.g., once security context is established at the base station, all signaling is encrypted and integrity protected), a base station 105 may transmit a SIB that contains information (e.g., SI) permitting a UE 115 to establish connectivity with the base station 105. Conventionally, the SIB has not been encrypted, but once security context is established at the base station 105, all signaling may be encrypted and integrity protected. However, the unencrypted SIB may allow an attacker (e.g., hacker) to potentially alter SI in the SIB as part of a DoS attack. To prevent the DoS attack, a private key has been distributed to base stations and used to generate a digital signature for the SIB to enhance security against false base stations. For example, even if an attacker can fake the SI, the attacker cannot establish a secure connection with the target UE 115 as authentication would fail (e.g., for initial access) or an AS security mode command (SMC) would fail. However, there are many base stations, and hackers have found ways to steal private keys from the base stations or cause other types of DoS (e.g., sending an unprotected rejection message, jamming, etc.).

In some cases, a public key crypto based solution may prevent the various types of DoS attacks. However, a shared public key may not scale and/or may be hard to be used for broadcast message protection. Additionally, no shared public key may be available before initial registration (e.g., with a subscription concealed identifier (SUCI)) based on not having a security context.

In some cases, for an RRC idle mode from an AS security perspective with respect to UE detection of rogue base stations 105 (e.g., false base stations 105), various solutions to verify or authenticate a base station 105 have been proposed. For example, for SI verification using a digital signatures solution to mitigate a replay attack (e.g., DoS attack), the size of protected SI may get larger due to the digital signature and timestamp parameters. Additionally or alternatively, a UE 115 verifying a base station 105 with a 'System Query' solution may include the UE 115 communicating with the network despite being in an RRC idle state or mode. In some cases, the UE 115 may use a minimization of drive test (MDT) to verify a base station 105, but this MDT solution may be passive and not a prevention type solution. Thus, the UE 115 may camp on a false base station (e.g., false cell) while in an RRC idle state, leading to a possible DoS or an availability attack (e.g., such as public safety warnings, incoming emergency calls, real-time application server push services, proximity services, etc.). As some services, like an earthquake and tsunami warning system (ETWS), may be offered to the UE 115 in the RRC idle mode through SIBs, it may be necessary to consider and to ensure that the UE 115 receives those services, which would not be the case if the UE 115 is camping at a false base station 105 (e.g., rogue base station 105, rogue eNB, etc.).

From an RRC control plane signaling (e.g., unicast messages) perspective, procedures may be performed before an AS security activation, including an RRC connection setup procedure, a UE identity acquisition procedure, a UE capability information transfer, a downlink/uplink information transfer procedure, etc. These unicast messages may need protection as well. For example, reported hackings on LTE networks have been on unprotected initial messages, such as an Attach Reject message (e.g., evolved packet system (EPS) mobility management (EMM) error codes), a Tracking Area Update Reject message, etc., which are transmitted over the air interface before an AS security activation.

Figure 2:
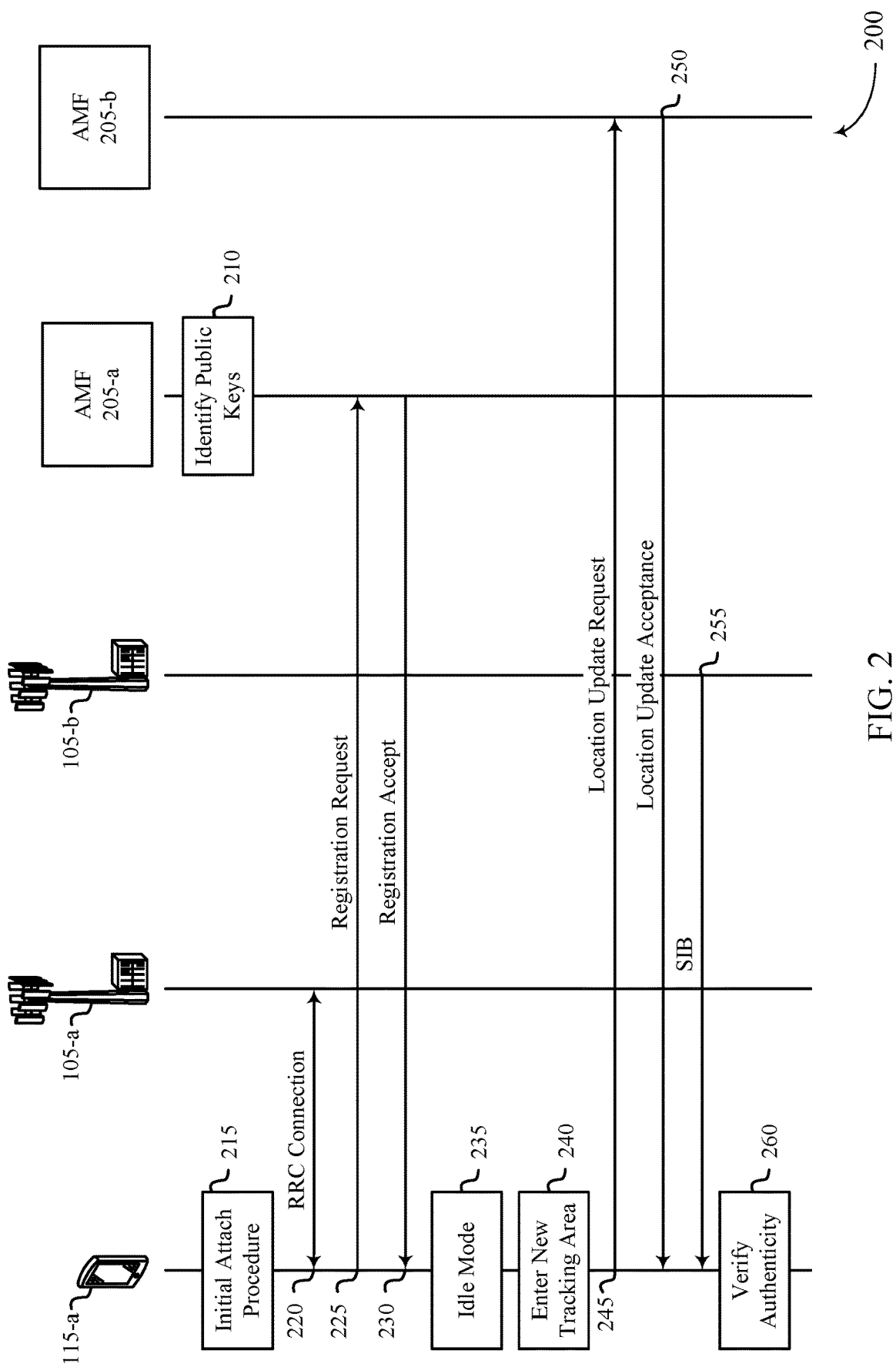
FIG. 2 illustrates an example of a cell authentication that supports SI protection at an NF in the core network in accordance with aspects of the present disclosure.

FIG. 2 illustrates an example of a cell authentication 200 that supports SI protection at an NF in the core network in accordance with aspects of the present disclosure. In some examples, cell authentication 200 may implement aspects of wireless communications system 100. Cell authentication 200 may include a UE 115-a, a base station 105-a, and a base station 105-b, which may be examples of corresponding UEs 115 and base stations 105, respectively, as described above with reference to FIG. 1. Additionally, cell authentication 200 may include an AMF 205-a and an AMF 205-b, which may be virtually implemented functions in software of a core network.

Cell authentication 200 may represent a solution based on public key cryptography for verifying or authenticating if a received message is from a base station 105. For example, a signature may be added to an SIB (e.g., an SIB1, security SIB, etc.) so that a UE 115 that has acquired the SIB (e.g., and/or an MIB/SIB) can verify the SI. In some cases, an AMF 205 may provide the UE 115 with a public key that can be used for verification of the SIB signature (e.g., MIB/SIB signature) during the registration, where the public key is valid within a tracking area (e.g., geolocation area for the network). Additionally, the base station 105 may sign the SIB using a private key associated with the public key. Accordingly, when the UE 115 enters into a new tracking area, the UE 115 may obtain a new public key from the AMF 205 during the registration (e.g., via a mobility registration update). As shown, cell authentication 200 may include a number of operations for the above described public key crypto authentication procedure.

At 210, AMF 205-a may be pre-provisioned with one or more public keys (K-SIG$_{Public}$) for distribution for all tracking area indications (TAIs) under control of AMF 205-a. At 215, UE 115-a may perform an initial attach procedure to connect with the network (e.g., base station 105-a, the core network, etc.).

At 220, UE 115-a may perform an RRC connection to establish a connection with base station 105-a (e.g., a random access procedure). At 225, UE 115-a may transmit a registration request to AMF 205-a. At 230, in response, AMF 205-a may transmit a registration accept message to UE 115-a. In some cases, the registration accept message may include a list of TAIs and corresponding public keys for the TAIs (e.g., a first K-SIG$_{Public}$ of a first TAI (TAI-1), a second K-SIG$_{Public}$ of a second TAI (TAI-2), a third K-SIG$_{Public}$ of a third TAI (TAI-3), etc.).

At 235, UE 115-a may transition into an idle mode (e.g., RRC idle mode). In some cases, while in the idle mode, UE 115-a may enter into a new tracking area (e.g., TAI-2). Accordingly, UE 115-a may verify a digital signature (DS) in an SIB received while in the new tracking area using a public key for the tracking area (e.g., the second K-SIG$_{Public}$ of TAI-2) and then may reselect the cell transmitting the public key in this new tracking area.

Additionally or alternatively, at 240, while in the idle mode, UE 115-a may enter into a different tracking area (e.g., TAI-4). In some cases, UE 115-a may detect that this different tracking area (TAI-4) is not in the list of TAIs that UE 115-a registered with the network at 225 and 230. After performing a cell reselection, UE 115-a may perform a tracking area update (TAU) procedure before camping on the new cell in the different tracking area (e.g., base station 105-b). Once the TAU is performed, UE 115-a may obtain the public key of the different tracking area (TAI-4) and also a list of TAIs under the control of AMF 205-b.

For example, at 245, UE 115-a may transmit a location update request (e.g., a mobility registration update) to AMF 205-b. Subsequently at 250, AMF 205-b may transmit a location update accept message that includes the list of TAIs under the control of AMF 205-b and the corresponding public keys (e.g., a fourth K-SIG$_{Public}$ of the fourth TAI (TAI-4), a fifth K-SIG$_{Public}$ of a fifth TAI (TAI-5), a sixth K-SIG$_{Public}$ of a sixth TAI (TAI-6, etc.).

At 255, base station 105-b may transmit an SIB with a DS. In some cases, base station 105-b may transmit the SIB via RRC signaling, a broadcasted transmission, etc.

At 260, UE 115-a may verify the DS in the SIB using the public key (K-SIG$_{Public}$) for the TAI-4 and then may reselect the cell (e.g., base station 105-b) after verifying the SIB is from base station 105-b. Accordingly, the SIB may be signed by base station 105-b (e.g., the network) that is then sent out to one or more UEs 115 (e.g., including UE 115-a), and UE 115-a can verify the SIB signature broadcasted by base station 105-b based on the public key for the tracking area associated with base station 105-b.

However, an AMF 205 and all base stations 105 within a tracking area may share a same private key. Accordingly, if a single entity (e.g., a base station 105) is compromised by an attacker (e.g., hacker) and the signing key (i.e., private key) is revealed to the attacker, the entire system security (e.g., within a tracking area) may be compromised. Additionally, considering base stations may be deployed closer to users/attackers (e.g., due to shorter coverage), sharing a single key among many base stations may not be desirable. More efficient techniques than cell authentication 200 may be desired.

Figure 3:
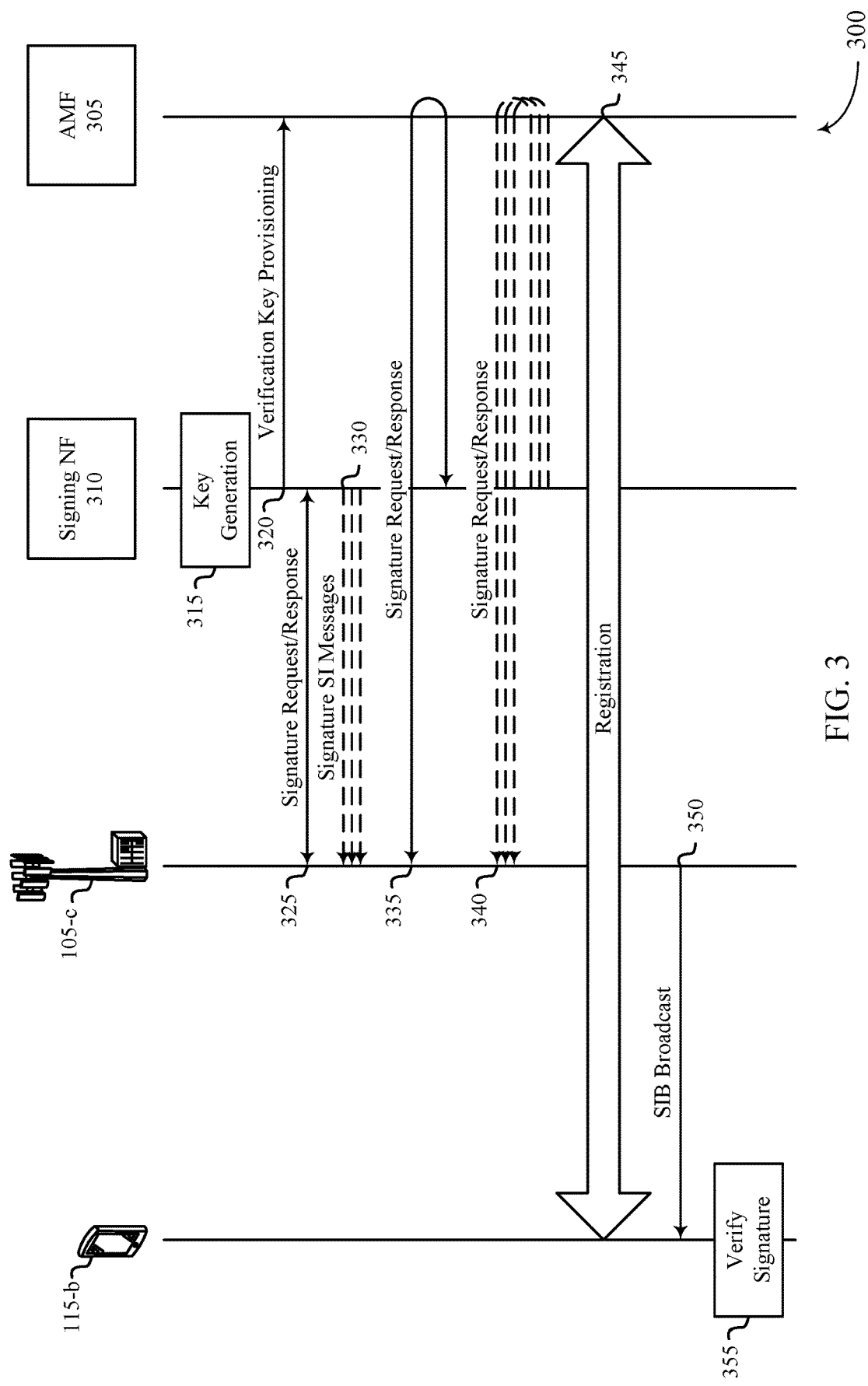
FIG. 3 illustrates an example of a process flow that supports SI protection at an NF in the core network in accordance with aspects of the present disclosure.

FIG. 3 illustrates an example of a process flow 300 that supports SI protection at an NF in the core network in accordance with aspects of the present disclosure. In some examples, process flow 300 may implement aspects of wireless communications system 100. Process flow 300 may include a UE 115-b and a base station 105-c, which may be examples of corresponding UEs 115 and base stations 105, respectively, as described above with reference to FIGS. 1 and 2. Additionally, process flow 300 may include an AMF 305 and a signing NF 310, which may be virtually implemented functions in software and/or hardware of a network node, such as a core network node within a core network. In some cases, signing NF 310 may be collocated with AMF 305 and/or a security anchor function (SEAF).

At 315, a network node may generate one or more public key (PK)-private key (SK) pairs. The network node may be a signing function node such as signing NF 310, a radio access network (RAN) node, an application function (AF) node, an AMF, a core network node, or the like. In some cases, the public keys may be referred to as verification keys, and the private keys may be referred to as signing keys. Additionally, the private keys may be kept locally at signing NF 310. Accordingly, based on keeping the private keys locally at signing NF 310, an attacker may have a more difficult time procuring the private key, thereby enhancing system security. In some cases, signing NF 310 may have multiple PK-SK pairs with a corresponding key identifier (ID).

At 320, signing NF 310 may provision one or more PKs (e.g., with corresponding key IDs) at AMF(s) 305 within a tracking area (e.g., an area where the PK is valid). For example, AMF 305 may receive one or more public key(s) and the key ID for a tracking area from the signing NF 310.

At 325, base station 105-b may send an MIB and/or SIBs as part of a signature request (e.g., signing request) to the core network via signing NF 310. For example, base station 105-b may transmit the signature request directly to signing NF 310. Additionally or alternatively, base station 105-b may transmit the signature request to the core network and signing NF 310 via AMF 305. In some cases, the signature request may include a recency parameter (e.g., a freshness parameter). For example, the recency parameter may be a system frame number (SFN) that can be used as a freshness parameter for signature generation. Accordingly, the SFN may need to be provided to signing NF 310. For example, the signature request and a signature response may be forwarded to AMF 305. Additionally, the signature request and signature response may be received from AMF 305 and forwarded to base station 105-b. In some cases, the signature may be requested via another core network function, such as AMF 305, as well as the signature response.

At 330, signing NF 310 may sign the MIB and/or SIB and may provide the signature to base station 105-c (e.g., directly or indirectly). Accordingly, base station 105-c may add the signature to an SIB message (e.g., SIB1 or other security SIB). In some cases, the base station 105-c may provide master information for signing to the signing NF 310, and the signing NF 310 may generate and provide a signature for the MIB. In some examples, the base station 105-c may provide both master information and system information for signing to the signing NF 310, and the signing NF 310 may generate and provide a single signature generated for the MIB and SIB. In another example, the signing NF 310 may generate and provide separate signatures generated for the MIB and SIB. At 335 and 340, base station 105-c and signing NF 310 may transmit and receive the signature request and the signature response routed through AMF 305.

At 345, a network node (e.g., a RAN node, an application function (AF) node, an AMF, a core network node, etc.), such as AMF 305, may receive a registration request from UE 115-b. In some cases, AMF 305 may send a registration response (e.g., NAS message, a registration accept, etc.) to UE 115-b that includes the public key(s) and the key ID. For example, the registration response may include a TAI list within which a PK is valid. Accordingly, UE 115-b may obtain one or more PKs with the associated or corresponding key IDs during the registration. For example, the network node (e.g., AMF 305) may provide tuples of the key ID and the corresponding public key to UE 115-b when UE 115-b registers with the network (e.g., via the registration response/accept message) to enable UE 115-b to verify an SI message and signature transmitted (e.g., broadcasted) by base station 105-c along with the key ID. In some cases, the registration may be an initial registration, a mobility registration update (e.g., for entering into a new tracking area), etc.

At 350, base station 105-c may transmit an SI message that includes SI and the signature received at 330 or 340. In some cases, the SI message may include the key ID that corresponds to the public key used by UE 115-b for the signature verification. For example, the signature messages provided to base station 105-c (e.g., by the network node, signing NF, etc.) at 330 or 340 may also carry the key ID to enable base station 105-c to broadcast the key ID along with the SI and signature. Accordingly, base station 105-c may broadcast an SIB1 that includes the signature generated based on the system information. In some examples, base station 105-c may broadcast an MIB message that includes a signature generated based on the master information. In some examples, the base station 105-c may broadcast a combined MIB/SIB message that includes a signature generated based on the master information and the system information. In some examples, the base station 105-c may broadcast a combined MIB/SIB message that includes a first signature generated based on the master information and a second signature generated based on the system information.

At 355, UE 115-b may verify the signature in the SI message (e.g., the MIB/SIBs signature) using a PK (e.g., received during registration at 345) associated with the tracking area indicated with the SI message (e.g., a verification key). Accordingly, if the signature is verified (e.g., UE 115-b determines base station 105-c transmitted the SI message), UE 115-b may utilize the system information included in the SIB message (and/or master information received in a combined MIB/SIB message or a separate MIB message that includes a signature generated using master information in accordance with the techniques described herein) may synchronize and establish connectivity with base station 105-c (e.g., a cell on base station 105-c). For example, UE 115-b may read the broadcasted SIB1 and verify the SIB1 signature before establishing a secure connection with base station 105-c for subsequent communications.

In some cases, base station 105-c may request bulk signatures. In some examples (e.g., a time based signature request), base station 105-c may request N signatures for a given time interval (e.g., T1 to T2 with an interval T_int). For example, base station 105-c may request signatures from a first time (e.g., T1, a first frame or subframe, etc.) to a second time (e.g., T2, a second frame or subframe, etc.) with a time interval (e.g., T_int, frame or subframe increment interval, etc.). Accordingly, signing NF 310 may generate signatures for T1, T1+T_int, T1+2*T_int, etc., until reaching T2. Additionally or alternatively, when using the recency parameter (e.g., SFN, freshness parameter), for a bulk signature request, base station 105-c may request signatures from an SFN start to an SFN end with a certain interval (e.g., SFN_int). For example, if signatures are requested for a first SFN (SFN1) to a 999th SFN (SFN999) with an interval of two (2), signing NF 310 may generate 500 signatures (e.g., for SFN 1, 3, 5 . . . , up to 999). The UE 115-b may attempt to verify a signature of a received SIB message for a system frame number falling within a subframe number range using a received public key and the subframe number for the SIB message to determine whether the received SIB message include authentic system information.

Additionally or alternatively, base station 105-c may subscribe to a signature service with signing NF 310. For example, signing NF 310 may provide new signatures to a subscribing base station 105 periodically. In some cases, when an SI message changes (e.g., MIB and/or SIB is changed by the base station 105 or other entity), base station 105-c may update the subscription or request a new subscription by providing the new SI message (e.g., new MIB/SIBs). The SI messages may not change often and be relatively static. Additionally, the bulk signature request may be done based on a subscription. Accordingly, the signatures may not be sent in a bulk signature response transmission but may be sent whenever the signatures are generated based on the subscription.

In some cases, AMF 305 may provision UE 115-b with PKs of one or more neighboring tracking areas. Additionally, AMF 305 may then provide these PKs to UE 115-b during the registration described at 345. In an example, during registration, the AMF 305 may provision UE 115-b with at least one PK of a serving tracking area, and one or more PKs of one or more neighboring tracking areas. As such, when UE 115-b moves from a serving tracking area into a neighboring tracking area, UE 115-b may verify an SI message (e.g., MIB/SIB) received in the neighboring tracking area using the key previously received from AMF 305. Alternatively or additionally, if AMF 305 did not store PKs of neighboring tracking areas and provide them to UE 115-b, UE 115-b may not verify the signature during mobility to a neighboring tracking area. Accordingly, an attacker may then be able to exploit this inability to verify the signature of the neighboring tracking area (e.g., by keep broadcasting a new tracking area in a SIB (e.g., SIB1) to initiate a DoS attack at UE 115-b).

Figure 4:
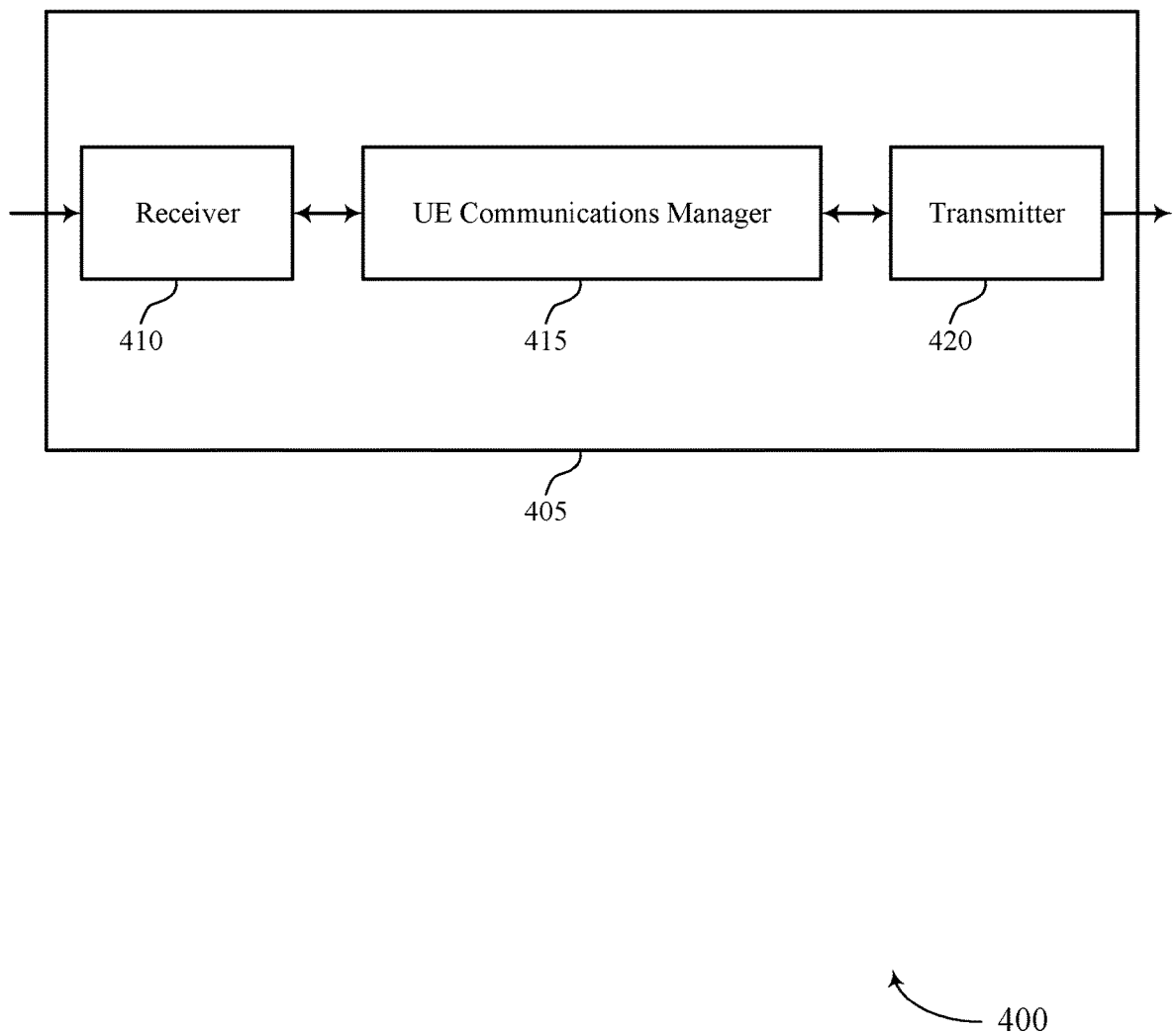
FIGS. 4 and 5 show block diagrams of devices that support SI protection at an NF in the core network in accordance with aspects of the present disclosure.

FIG. 4 shows a block diagram 400 of a device 405 that supports SI protection at an NF in the core network in accordance with aspects of the present disclosure. The device 405 may be an example of aspects of a UE 115 as described herein. The device 405 may include a receiver 410, a UE communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to SI protection at an NF in the core network, etc.). Information may be passed on to other components of the device 405. The receiver 410 may be an example of aspects of the transceiver 720 described with reference to FIG. 7. The receiver 410 may utilize a single antenna or a set of antennas.

The UE communications manager 415 may transmit a registration request to a core network node (e.g., an AMF). Additionally, the UE communications manager 415 may receive, from the core network node, a registration response that includes a first public key corresponding to a first private key used to generate a first signature for first SI for a first tracking area and a second public key corresponding to a second private key used to generate a second signature for second SI for a second tracking area that is geolocated relative to the first tracking area. Subsequently, the UE communications manager 415 may monitor for an SI message that includes the first SI and the first signature or includes the second SI and the second signature. The UE communications manager 415 may be an example of aspects of the UE communications manager 710 described herein.

Based on the actions performed by the UE communications manager 415 as described herein, a UE 115 may reduce latency when switching from one tracking area to another tracking area. For example, by generating multiple signatures (e.g., the first signature and the second signature) for corresponding public key-private key pairs and associated tracking areas, if the UE 115 moves from one tracking area to the next tracking area, the UE 115 may verify a signature for the next tracking area immediately rather than waiting to receive a public key for the next tracking area and then generating the signature. Additionally, by generating the multiple signatures at once, the UE 115 may preclude any DOS attacks from happening by having the signatures preloaded while moving from tracking area to tracking area where an attacker could potentially try to keep broadcasting new tracking areas in an SIB. As such, with the signatures preloaded during this mobility scenario, the UE 115 can verify or identify if the SIB is authentic or not before getting stuck in an endless loop with new tracking areas being transmitted to the UE 115 (e.g., DoS attack).

The UE communications manager 415, or its sub-components, may be implemented in hardware, code (e.g., software or firmware) executed by a processor, or any combination thereof. If implemented in code executed by a processor, the functions of the UE communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 415, or its sub-components, may be physically located at various positions, including being distributed such that portions of functions are implemented at different physical locations by one or more physical components. In some examples, the UE communications manager 415, or its sub-components, may be a separate and distinct component in accordance with various aspects of the present disclosure. In some examples, the UE communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
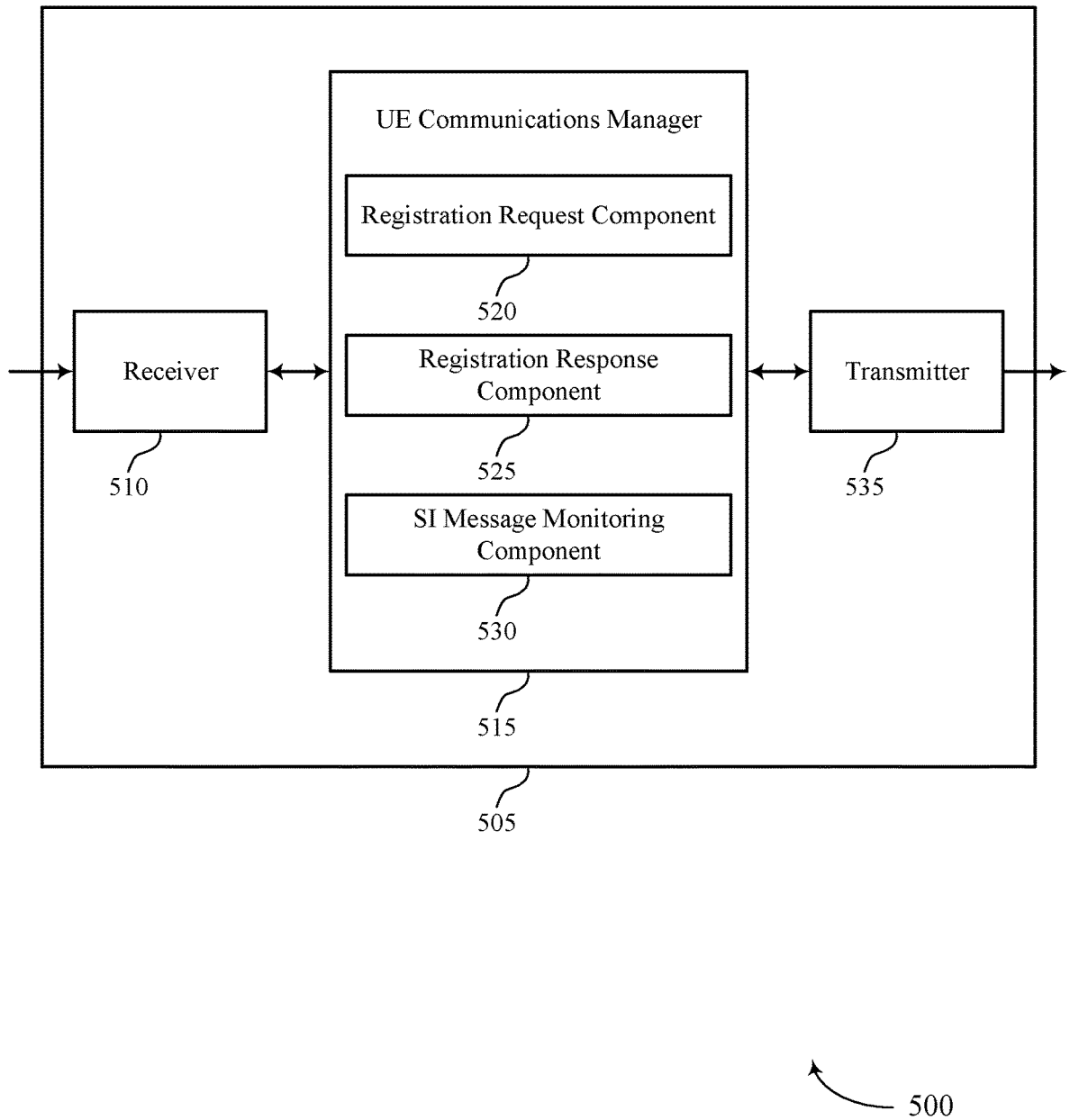

FIG. 5 shows a block diagram 500 of a device 505 that supports SI protection at an NF in the core network in accordance with aspects of the present disclosure. The device 505 may be an example of aspects of a device 405, or a UE 115 as described herein. The device 505 may include a receiver 510, a UE communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to SI protection at an NF in the core network, etc.). Information may be passed on to other components of the device 505. The receiver 510 may be an example of aspects of the transceiver 720 described with reference to FIG. 7. The receiver 510 may utilize a single antenna or a set of antennas.

The UE communications manager 515 may be an example of aspects of the UE communications manager 415 as described herein. The UE communications manager 515 may include a registration request component 520, a registration response component 525, and an SI message monitoring component 530. The UE communications manager 515 may be an example of aspects of the UE communications manager 710 described herein.

The registration request component 520 may transmit a registration request to a core network node (e.g., an AMF).

The registration response component 525 may receive, from the core network node, a registration response that includes a first public key corresponding to a first private key used to generate a first signature for first SI for a first tracking area and a second public key corresponding to a second private key used to generate a second signature for second SI for a second tracking area that is geolocated relative to the first tracking area.

The SI message monitoring component 530 may monitor for an SI message that includes the first SI and the first signature or includes the second SI and the second signature.

Based on receiving the registration response and generating the multiple signatures, a processor of a UE 115 (e.g., controlling the receiver 510, the transmitter 535, or a transceiver 720 as described with reference to FIG. 7) may prevent the UE 115 from expending unnecessary battery power by getting caught in a DoS attack as described above. Additionally, the processor of the UE 115 may reduce signaling overhead by receiving the single registration response and generating the multiple signatures rather than generating a single signature per registration response, where each registration response is transmitted and processed by the processor of the UE 115.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
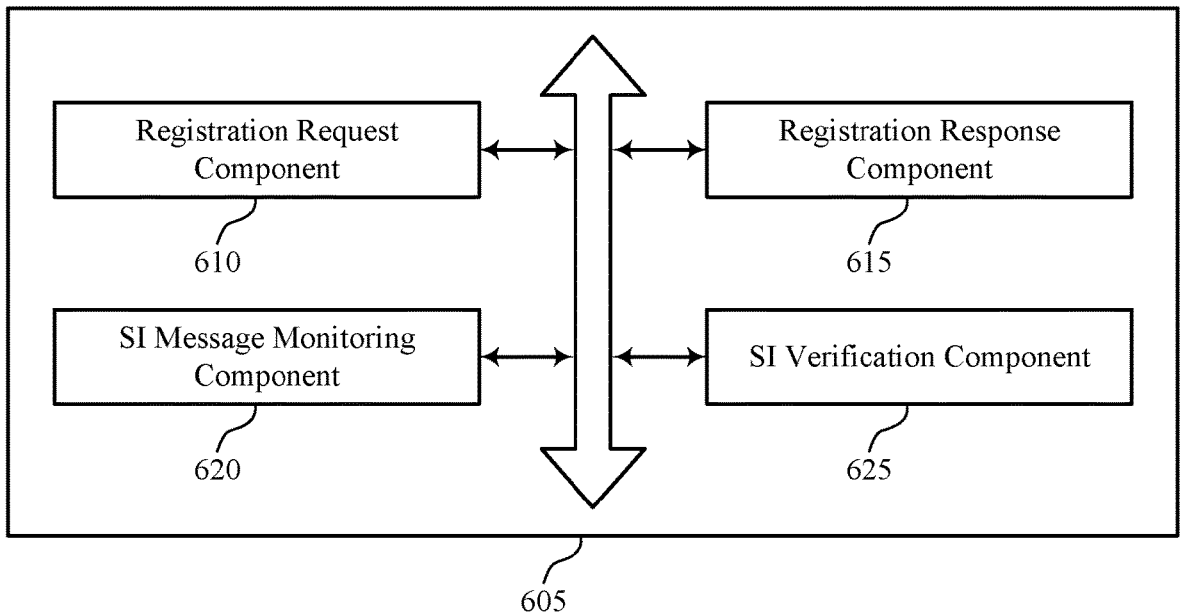
FIG. 6 shows a block diagram of a user equipment (UE) communications manager that supports SI protection at an NF in the core network in accordance with aspects of the present disclosure.

FIG. 6 shows a block diagram 600 of a UE communications manager 605 that supports SI protection at an NF in the core network in accordance with aspects of the present disclosure. The UE communications manager 605 may be an example of aspects of a UE communications manager 415, a UE communications manager 515, or a UE communications manager 710 described herein. The UE communications manager 605 may include a registration request component 610, a registration response component 615, an SI message monitoring component 620, and an SI verification component 625. Each of these modules may communicate, directly or indirectly, with one another (e.g., via one or more buses).

The registration request component 610 may transmit a registration request to a core network node (e.g., an AMF). In some examples, the registration request component 610 may transmit a mobility registration update request indicating that the UE has moved from a first tracking area to a second tracking area.

The registration response component 615 may receive, from the core network node, a registration response that includes a first public key corresponding to a first private key used to generate a first signature for first SI for a first tracking area and a second public key corresponding to a second private key used to generate a second signature for second SI for a second tracking area that is geolocated relative to the first tracking area.

The SI message monitoring component 620 may monitor for an SI message that includes the first SI and the first signature or includes the second SI and the second signature. In some examples, the SI message monitoring component 620 may receive the SI message that indicates an identifier (e.g., key ID) of the first public key corresponding to the first private key used to generate the first signature.

The SI verification component 625 may receive the SI message that includes the first SI and the first signature and may verify the first SI based on the first signature. In some examples, the SI verification component 625 may establish connectivity with a base station within the first tracking area based on the verified first SI. Additionally or alternatively, the SI verification component 625 may receive the SI message that includes the second SI and the second signature and may verify the second SI based on the second signature. Accordingly, the SI verification component 625 may establish connectivity with a base station within the second tracking area based on the verified second SI.

Figure 7:
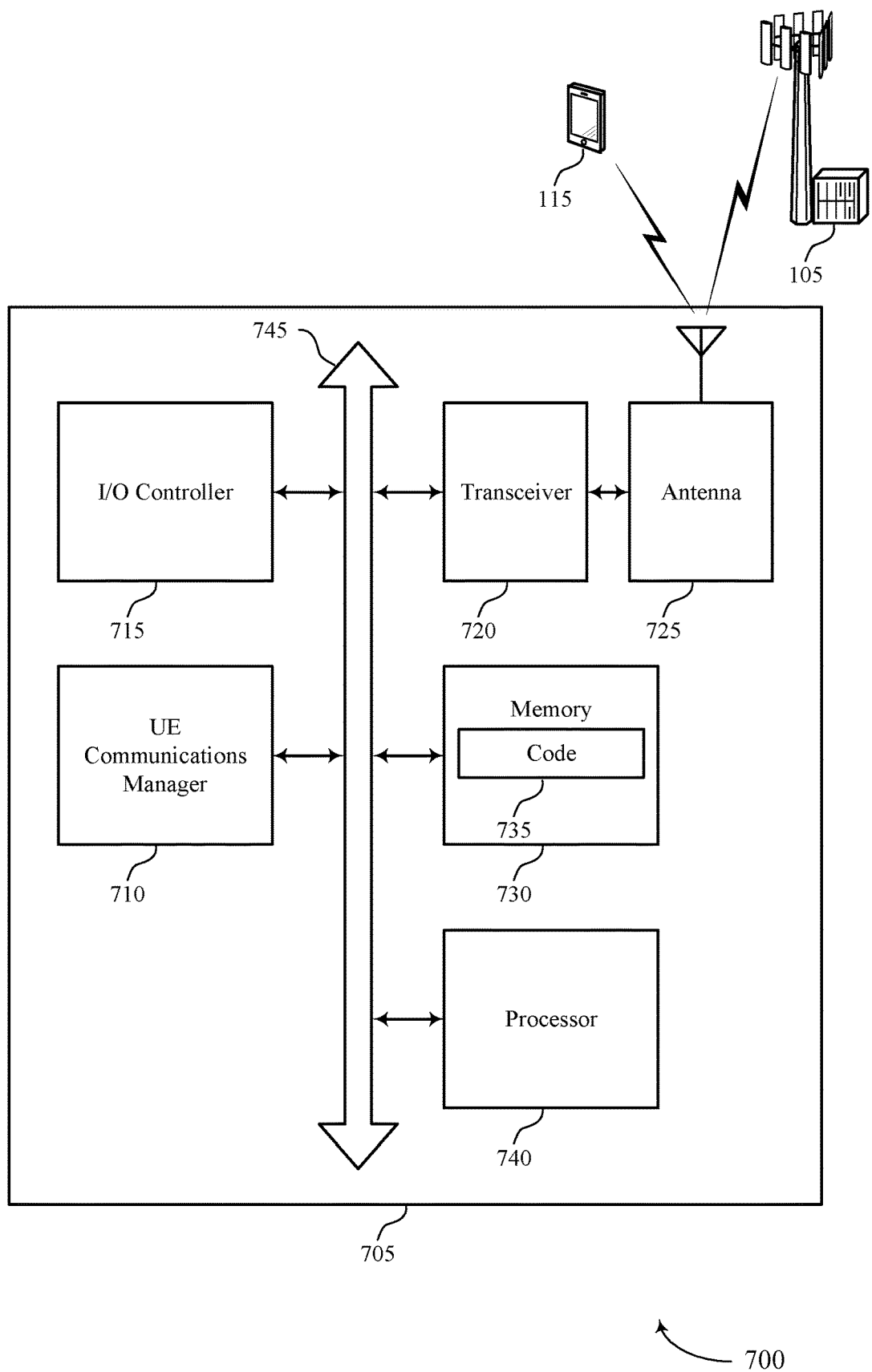
FIG. 7 shows a diagram of a system including a device that supports SI protection at an NF in the core network in accordance with aspects of the present disclosure.

FIG. 7 shows a diagram of a system 700 including a device 705 that supports SI protection at an NF in the core network in accordance with aspects of the present disclosure. The device 705 may be an example of or include the components of device 405, device 505, or a UE 115 as described herein. The device 705 may include components for bi-directional voice and data communications including components for transmitting and receiving communications, including a UE communications manager 710, an I/O controller 715, a transceiver 720, an antenna 725, memory 730, and a processor 740. These components may be in electronic communication via one or more buses (e.g., bus 745).

The UE communications manager 710 may transmit a registration request to a core network node (e.g., an AMF). Additionally, the UE communications manager 710 may receive, from the core network node, a registration response that includes a first public key corresponding to a first private key used to generate a first signature for first SI for a first tracking area and a second public key corresponding to a second private key used to generate a second signature for second SI for a second tracking area that is geolocated relative to the first tracking area. Subsequently, the UE communications manager 710 may monitor for an SI message that includes the first SI and the first signature or includes the second SI and the second signature.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting SI protection at an NF in the core network).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
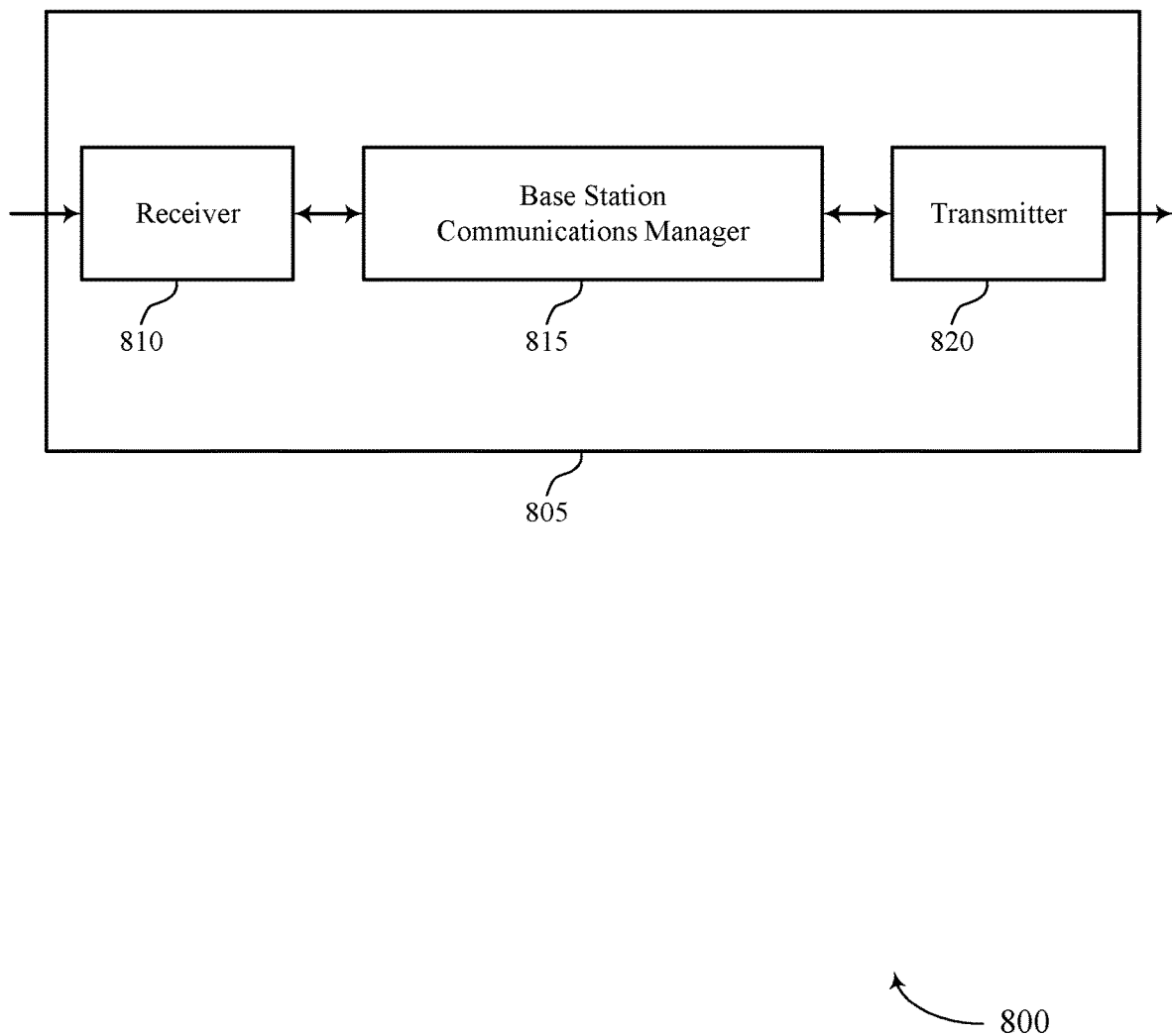
FIGS. 8 and 9 show block diagrams of devices that support SI protection at an NF in the core network in accordance with aspects of the present disclosure.

FIG. 8 shows a block diagram 800 of a device 805 that supports SI protection at an NF in the core network in accordance with aspects of the present disclosure. The device 805 may be an example of aspects of a base station 105 as described herein. The device 805 may include a receiver 810, a base station communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to SI protection at an NF in the core network, etc.). Information may be passed on to other components of the device 805. The receiver 810 may be an example of aspects of the transceiver 1120 described with reference to FIG. 11. The receiver 810 may utilize a single antenna or a set of antennas.

The base station communications manager 815 may transmit, to a network node (e.g., a signing NF, a RAN node, an AF node, an AMF, a core network node, or the like), a signature request that includes SI. In some cases, the base station communications manager 815 may receive, from the network node, a signature response that includes a signature generated based on the SI. Additionally, the base station communications manager 815 may transmit (e.g., broadcast) an SI message that includes the SI and the signature. The base station communications manager 815 may be an example of aspects of the base station communications manager 1110 described herein.

Based on the actions performed by the base station communications manager 815 as described herein, a base station 105 may enhance security in the system by retrieving signature responses from the network node (e.g., the signing NF). For example, the signature responses may include signatures generated at the network node rather than receiving a private key and signing an SI message itself. By taking the signature generation out of the hands of the base station 105, the base station 105 may not be exploited by an attacker because the base station 105 has no records of private keys stored in the base station 105.

The base station communications manager 815, or its sub-components, may be implemented in hardware, code (e.g., software or firmware) executed by a processor, or any combination thereof. If implemented in code executed by a processor, the functions of the base station communications manager 815, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 815, or its sub-components, may be physically located at various positions, including being distributed such that portions of functions are implemented at different physical locations by one or more physical components. In some examples, the base station communications manager 815, or its sub-components, may be a separate and distinct component in accordance with various aspects of the present disclosure. In some examples, the base station communications manager 815, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
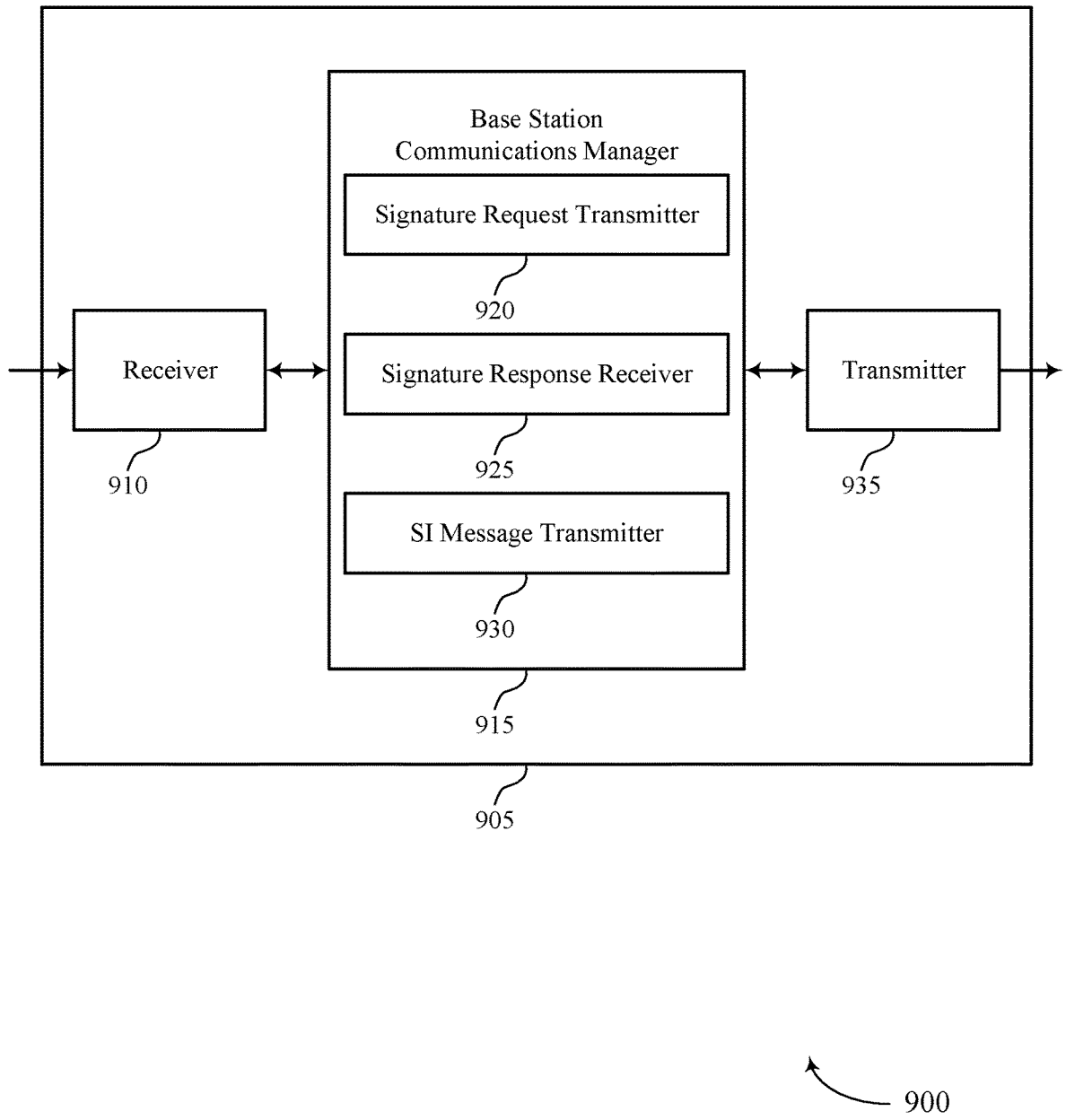

FIG. 9 shows a block diagram 900 of a device 905 that supports SI protection at an NF in the core network in accordance with aspects of the present disclosure. The device 905 may be an example of aspects of a device 805, or a base station 105 as described herein. The device 905 may include a receiver 910, a base station communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to SI protection at an NF in the core network, etc.). Information may be passed on to other components of the device 905. The receiver 910 may be an example of aspects of the transceiver 1120 described with reference to FIG. 11. The receiver 910 may utilize a single antenna or a set of antennas.

The base station communications manager 915 may be an example of aspects of the base station communications manager 815 as described herein. The base station communications manager 915 may include a signature request transmitter 920, a signature response receiver 925, and an SI message transmitter 930. The base station communications manager 915 may be an example of aspects of the base station communications manager 1110 described herein.

The signature request transmitter 920 may transmit, to a network node (e.g., a RAN node, an AF node, an AMF, a core network node, a signing NF, or the like), a signature request that includes SI.

The signature response receiver 925 may receive, from the network node, a signature response that includes a signature generated based on the SI.

The SI message transmitter 930 may transmit (e.g., broadcast) an SI message that includes the SI and the signature.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
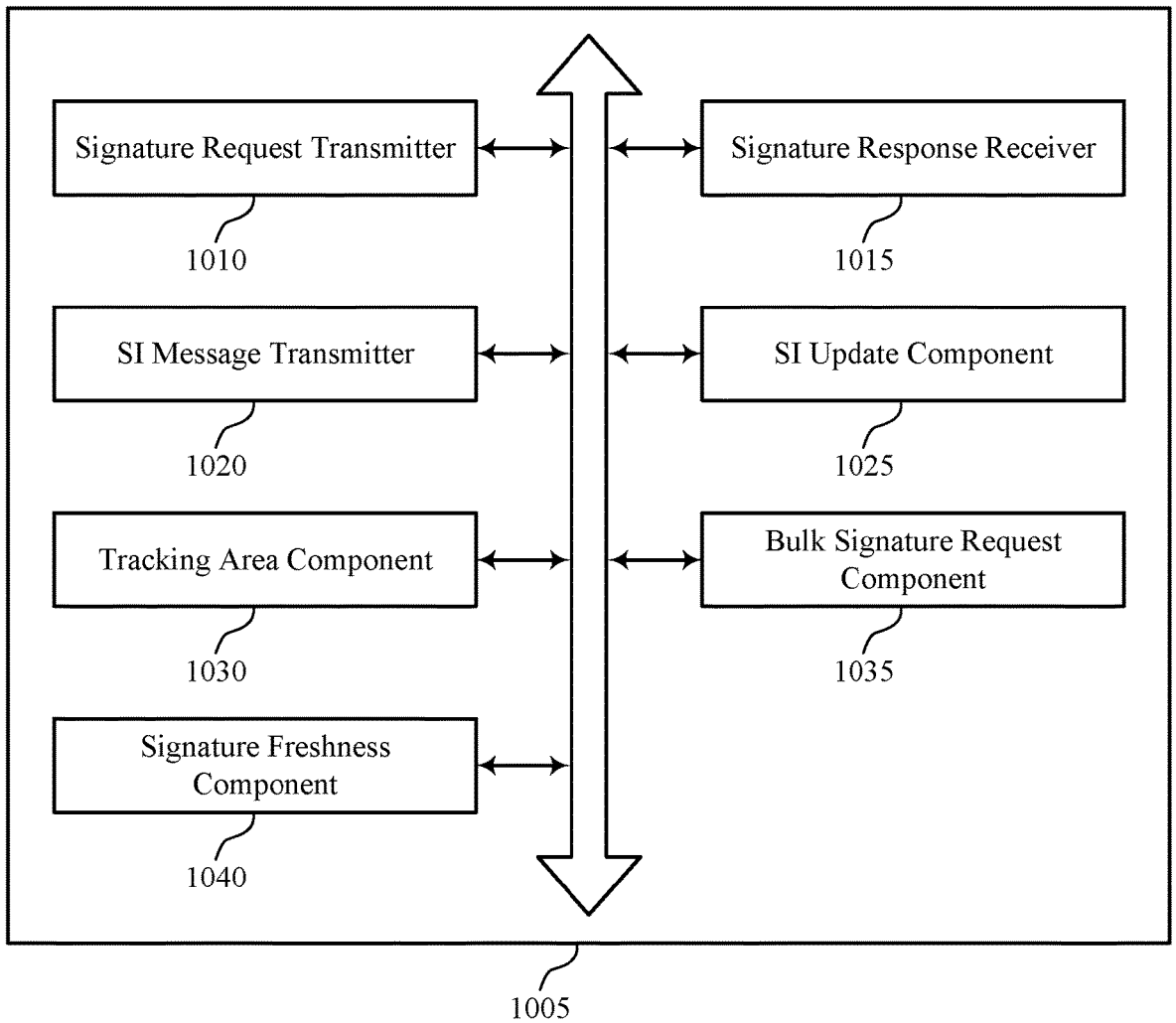
FIG. 10 shows a block diagram of a base station communications manager that supports SI protection at an NF in the core network in accordance with aspects of the present disclosure.

FIG. 10 shows a block diagram 1000 of a base station communications manager 1005 that supports SI protection at an NF in the core network in accordance with aspects of the present disclosure. The base station communications manager 1005 may be an example of aspects of a base station communications manager 815, a base station communications manager 915, or a base station communications manager 1110 described herein. The base station communications manager 1005 may include a signature request transmitter 1010, a signature response receiver 1015, an SI message transmitter 1020, an SI update component 1025, a tracking area component 1030, a bulk signature request component 1035, and a signature freshness component 1040. Each of these modules may communicate, directly or indirectly, with one another (e.g., via one or more buses).

The signature request transmitter 1010 may transmit, to a network node, a signature request that includes SI. In some examples, the signature request transmitter 1010 may transmit the signature request that includes the SI and master information (e.g., MIB/SIBs), where the signature is generated based on the SI and the master information. Additionally or alternatively, the signature request transmitter 1010 may transmit the signature request to request a set of signatures (e.g., bulk signature request) for a time range and a time increment interval.

The signature response receiver 1015 may receive, from the network node, a signature response that includes a signature generated based on the SI. In some examples, the signature response receiver 1015 may receive the signature response that includes the set of signatures. Additionally or alternatively, the signature response receiver 1015 may receive a set of signature responses that each includes a subset of one or more of the set of signatures, where each of the subsets corresponds to a respective time increment interval within the time range.

The SI message transmitter 1020 may transmit an SI message that includes the SI and the signature. In some examples, the SI message transmitter 1020 may transmit the SI message that indicates an identifier of a public key corresponding to a first private key used to generate the signature.

The SI update component 1025 may transmit, to the network node, a second signature request that includes updated SI and may receive, from the network node, a signature response that includes a second signature generated based on the updated SI. In some examples, the SI update component 1025 may transmitting an SI message that includes the updated SI and the second signature.

The tracking area component 1030 may receive a registration request from a UE and may transmit the registration request to a network node that provides an AMF. In some examples, the tracking area component 1030 may receive, from the network node, a registration response that includes a first public key corresponding to a first private key used to generate the signature and may transmit the registration response to the UE. In some examples, the tracking area component 1030 may transmit the registration response that includes a first tracking area for the first public key. Subsequently, the tracking area component 1030 may transmit the registration response that indicates a second public key for a second tracking area that is geolocated relative to the first tracking area, the second public key corresponding to a second private key used to generate a second signature for second SI transmitted within the second tracking area. In some examples, the tracking area component 1030 may receive a mobility registration update request from a UE indicating that the UE has entered a new tracking area.

The bulk signature request component 1035 may transmit the signature request that indicates a subframe increment interval and requests a set of signatures corresponding to a subframe number range between a beginning subframe number and an ending subframe number. In some examples, the bulk signature request component 1035 may receive the signature response that includes the set of signatures. Additionally or alternatively, the bulk signature request component 1035 may receive a set of signature responses that each includes a subset of one or more of the set of signatures. In some cases, each of the subsets may correspond to a respective subframe increment interval within the subframe number range.

The signature freshness component 1040 may transmit the signature request that includes a recency parameter. Additionally, the signature freshness component 1040 may receive, from the network node, the signature response that includes the signature that is generated based on the SI and the recency parameter. In some cases, the recency parameter may be an SFN.

Figure 11:
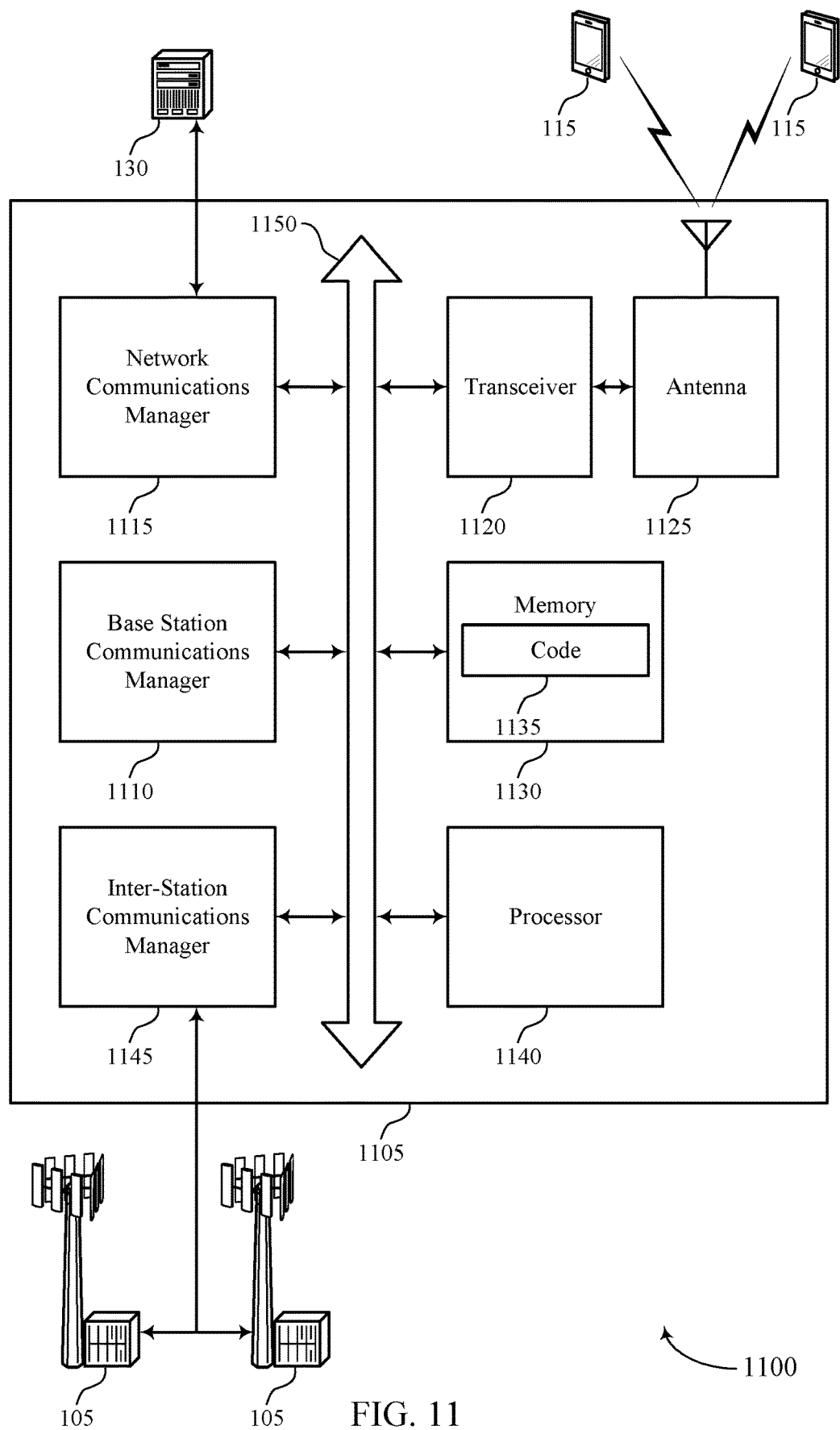
FIG. 11 shows a diagram of a system including a device that supports SI protection at an NF in the core network in accordance with aspects of the present disclosure.

FIG. 11 shows a diagram of a system 1100 including a device 1105 that supports SI protection at an NF in the core network in accordance with aspects of the present disclosure. The device 1105 may be an example of or include the components of device 805, device 905, or a base station 105 as described herein. The device 1105 may include components for bi-directional voice and data communications including components for transmitting and receiving communications, including a base station communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The base station communications manager 1110 may transmit, to a network node (e.g., a core network node, a signing NF), a signature request that includes SI. In some cases, the base station communications manager 1110 may receive, from the network node, a signature response that includes a signature generated based on the SI. Additionally, the base station communications manager 1110 may transmit an SI message that includes the SI and the signature.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting SI protection at an NF in the core network).

The inter-station communications manager 1145 may manage communications with other base stations 105 and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
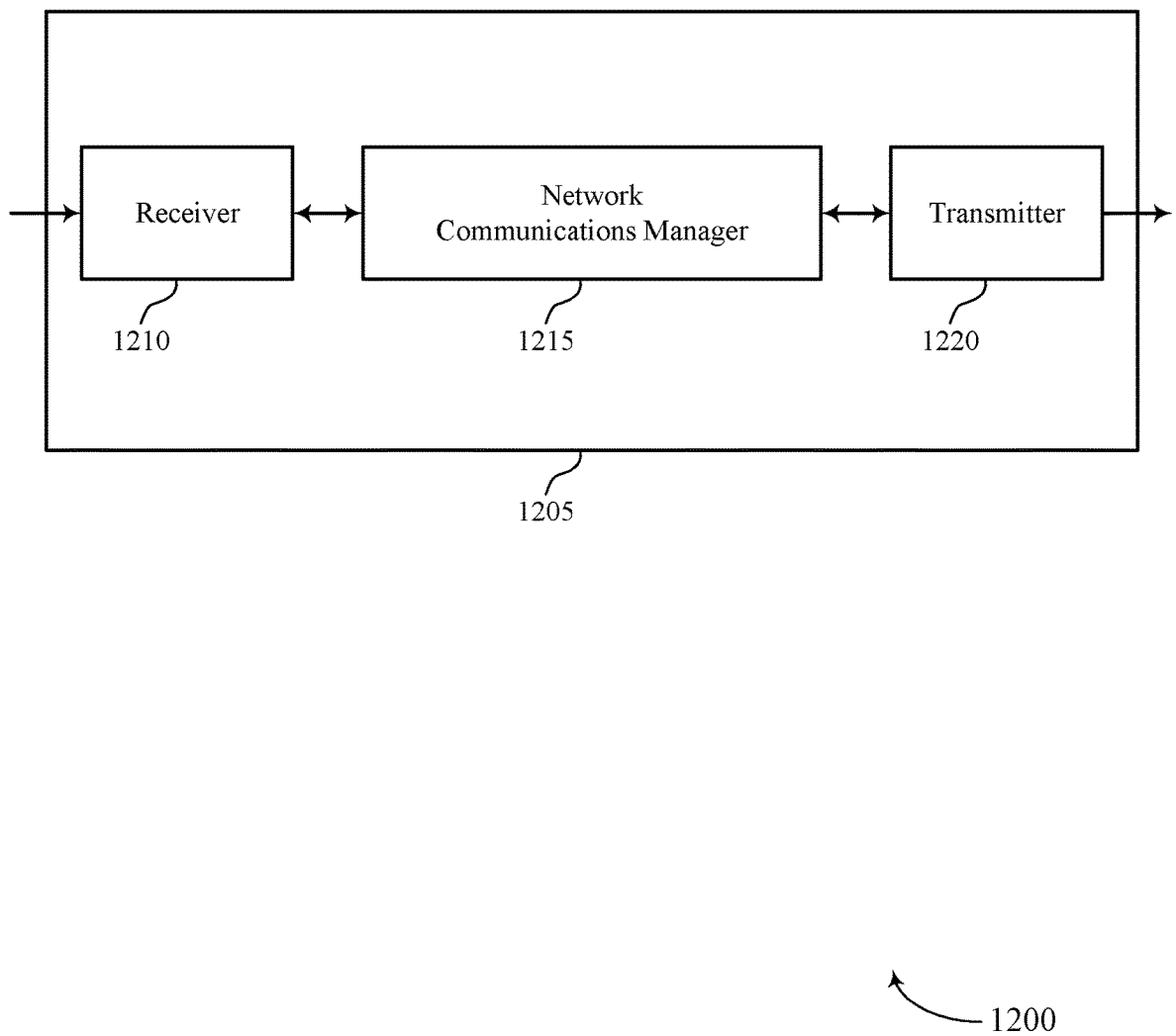
FIGS. 12 and 13 show block diagrams of devices that support SI protection at an NF in the core network in accordance with aspects of the present disclosure.

FIG. 12 shows a block diagram 1200 of a device 1205 that supports SI protection at an NF in the core network in accordance with aspects of the present disclosure. The device 1205 may be an example of aspects of a network node (e.g., a network entity, such as a core network node) as described herein. The device 1205 may include a receiver 1210, a network communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to SI protection at an NF in the core network, etc.). Information may be passed on to other components of the device 1205. The receiver 1210 may be an example of aspects of the transceiver 1520 described with reference to FIG. 15. The receiver 1210 may utilize a single antenna or a set of antennas.

The network communications manager 1215 may receive, from a base station, a signature request that includes SI. Additionally, the network communications manager 1215 may transmit, to the base station, a signature response that includes a signature generated based on the SI. The network communications manager 1215 may be an example of aspects of the network communications manager 1510 described herein.

Based on the action performed by the network communications manager 1215 as described herein, one or more functions in the core network (e.g., signing NF, AMF, etc.) may enhance security in the system. For example, the functions of the core network may store private key information higher upstream than a base station 105, where an attacker is less likely to be able to hack into the core network to acquire the private key information. Accordingly, the functions of the core network may prevent different types of DoS attacks by storing the private key information and transmitting a signature generated based on the private key information and an SI message.

The network communications manager 1215, or its sub-components, may be implemented in hardware, code (e.g., software or firmware) executed by a processor, or any combination thereof. If implemented in code executed by a processor, the functions of the network communications manager 1215, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The network communications manager 1215, or its sub-components, may be physically located at various positions, including being distributed such that portions of functions are implemented at different physical locations by one or more physical components. In some examples, the network communications manager 1215, or its sub-components, may be a separate and distinct component in accordance with various aspects of the present disclosure. In some examples, the network communications manager 1215, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
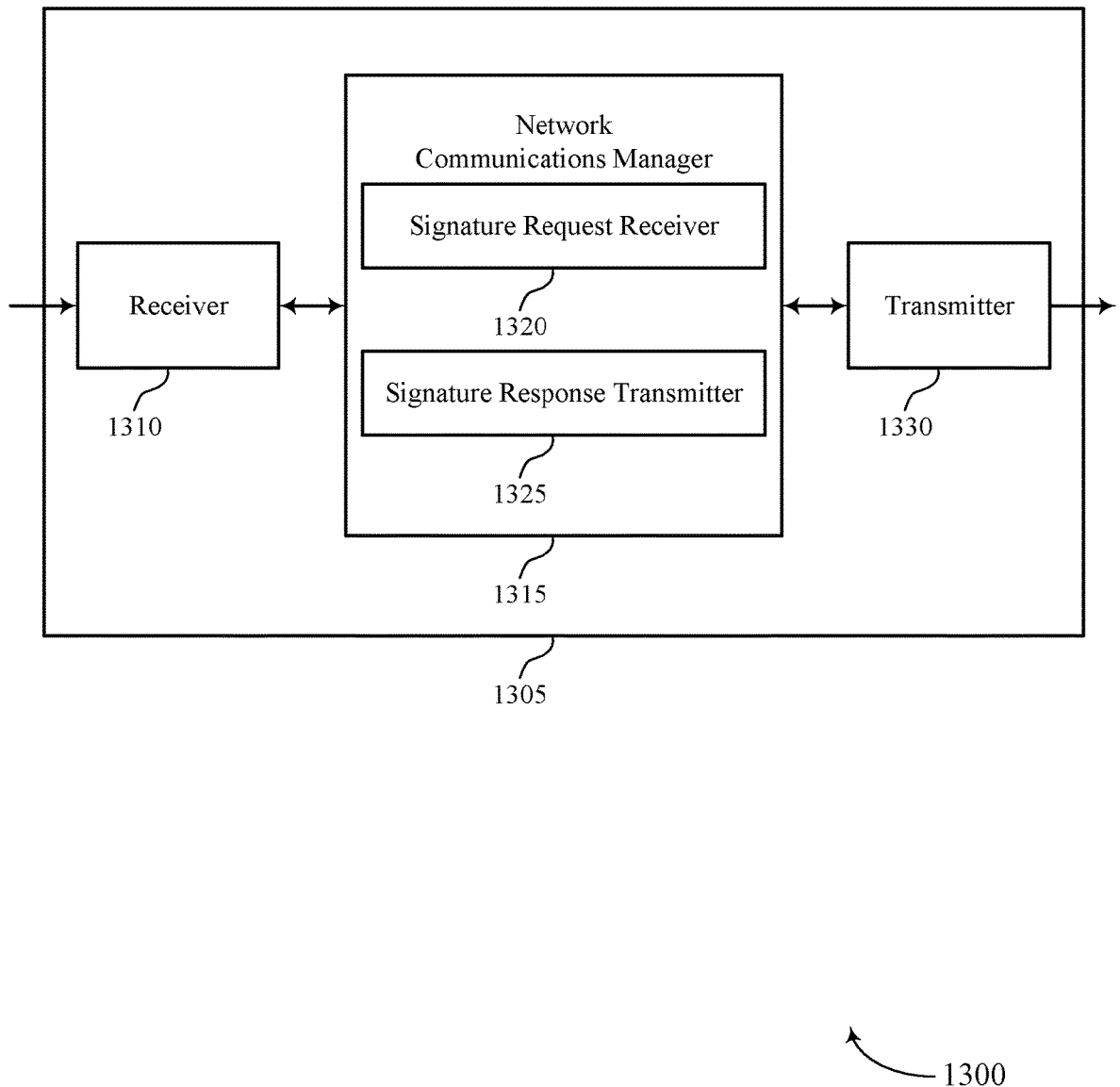

FIG. 13 shows a block diagram 1300 of a device 1305 that supports SI protection at an NF in the core network in accordance with aspects of the present disclosure. The device 1305 may be an example of aspects of a device 1205 or a network entity as described herein. The device 1305 may include a receiver 1310, a network communications manager 1315, and a transmitter 1330. The device 1305 may also include a processor. Each of these components may be in communication with one another (e.g., via one or more buses).

The receiver 1310 may receive information such as packets, user data, or control information associated with various information channels (e.g., control channels, data channels, and information related to SI protection at an NF in the core network, etc.). Information may be passed on to other components of the device 1305. The receiver 1310 may be an example of aspects of the transceiver 1520 described with reference to FIG. 15. The receiver 1310 may utilize a single antenna or a set of antennas.

The network communications manager 1315 may be an example of aspects of the network communications manager 1215 as described herein. The network communications manager 1315 may include a signature request receiver 1320 and a signature response transmitter 1325. The network communications manager 1315 may be an example of aspects of the network communications manager 1510 described herein.

The signature request receiver 1320 may receive, from a base station, a signature request that includes SI.

The signature response transmitter 1325 may transmit, to the base station, a signature response that includes a signature generated based on the SI.

The transmitter 1330 may transmit signals generated by other components of the device 1305. In some examples, the transmitter 1330 may be collocated with a receiver 1310 in a transceiver module. For example, the transmitter 1330 may be an example of aspects of the transceiver 1520 described with reference to FIG. 15. The transmitter 1330 may utilize a single antenna or a set of antennas.

Figure 14:
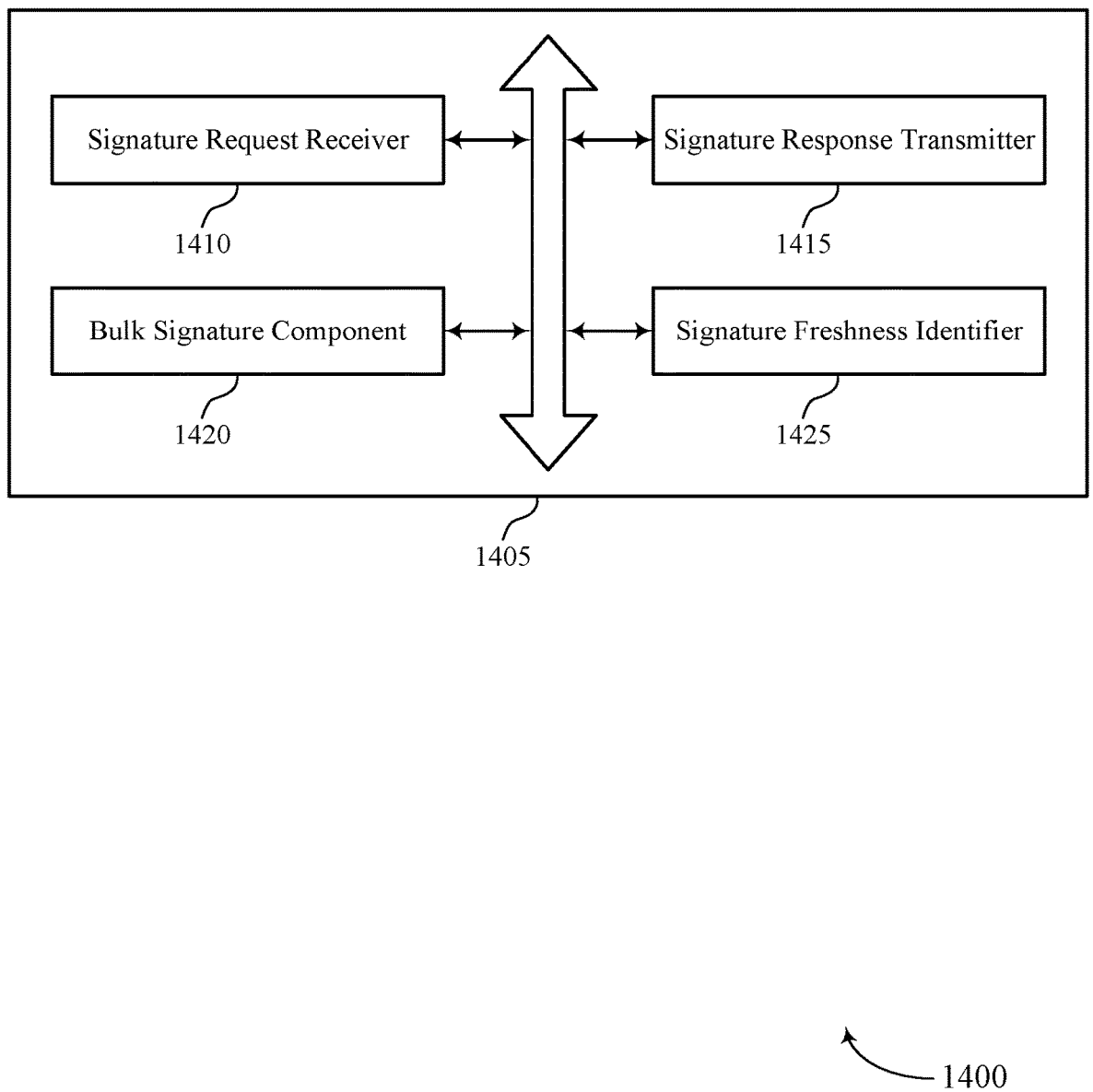
FIG. 14 shows a block diagram of a core network communications manager that supports SI protection at an NF in the core network in accordance with aspects of the present disclosure.

FIG. 14 shows a block diagram 1400 of a network communications manager 1405 that supports SI protection at an NF in the core network in accordance with aspects of the present disclosure. The network communications manager 1405 may be an example of aspects of a network communications manager 1215, a network communications manager 1315, or a network communications manager 1510 described herein. The network communications manager 1405 may include a signature request receiver 1410, a signature response transmitter 1415, a bulk signature component 1420, and a signature freshness identifier 1425. Each of these modules may communicate, directly or indirectly, with one another (e.g., via one or more buses).

The signature request receiver 1410 may receive, from a base station, a signature request that includes SI. In some examples, the signature request receiver 1410 may receive the signature request that includes the SI and master information (e.g., MIB/SIBs), where the signature is generated based on the SI and the master information. Additionally or alternatively, the signature request receiver 1410 may receive, from the base station, a second signature request that includes updated SI.

The signature response transmitter 1415 may transmit, to the base station, a signature response that includes a signature generated based on the SI. In some examples, the signature response transmitter 1415 may transmit a key identifier message that indicates an identifier (e.g., key ID) of a public key corresponding to a first private key used to generate the signature. In some examples, the signature response transmitter 1415 may transmit, to the base station, a signature response that includes a second signature generated based on the updated SI.

The bulk signature component 1420 may receive the signature request that requests a set of signatures for a time range and a time increment interval and may transmit the signature response that includes the set of signatures. Additionally or alternatively, the bulk signature component 1420 may transmit a set of signature responses that each includes a subset of one or more of the set of signatures, where each of the subsets corresponds to a respective time increment interval within the time range.

In some examples, the bulk signature component 1420 may receive the signature request that indicates a subframe increment interval and requests a set of signatures corresponding to a subframe number range between a beginning subframe number and an ending subframe number and may receive the signature response that includes the set of signatures. Additionally or alternatively, the bulk signature component 1420 may receive a set of signature responses that each includes a subset of one or more of the set of signatures, where each of the subsets corresponds to a respective subframe increment interval within the subframe number range.

The signature freshness identifier 1425 may receive the signature request that includes a recency parameter. In some examples, the signature freshness identifier 1425 may transmit, to the base station, the signature response that includes the signature that is generated based on the SI and the recency parameter. In some cases, the recency parameter may be an SFN.

Figure 15:
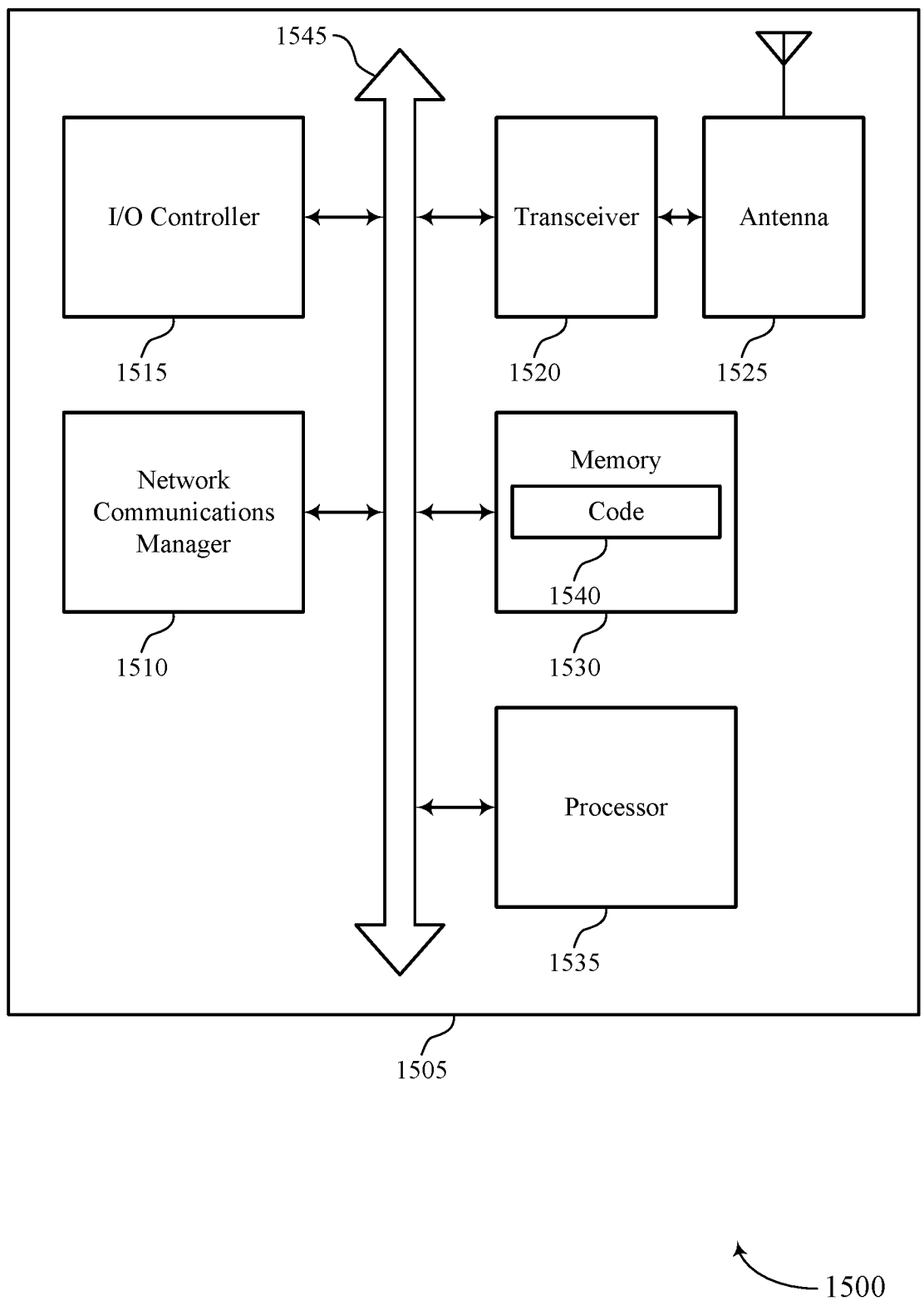
FIG. 15 shows a diagram of a system including a device that supports SI protection at an NF in the core network in accordance with aspects of the present disclosure.

FIG. 15 shows a diagram of a system 1500 including a device 1505 that supports SI protection at an NF in the core network in accordance with aspects of the present disclosure. The device 1505 may be an example of or include the components of device 1205, device 1305, or a network entity as described herein. The device 1505 may include components for bi-directional voice and data communications including components for transmitting and receiving communications, including a network communications manager 1510, an I/O controller 1515, a transceiver 1520, an antenna 1525, memory 1530, and a processor 1535. These components may be in electronic communication via one or more buses (e.g., bus 1545).

The network communications manager 1510 may receive, from a base station, a signature request that includes SI and transmit, to the base station, a signature response that includes a signature generated based on the SI.

The I/O controller 1515 may manage input and output signals for the device 1505. The I/O controller 1515 may also manage peripherals not integrated into the device 1505. In some cases, the I/O controller 1515 may represent a physical connection or port to an external peripheral. In some cases, the I/O controller 1515 may utilize an operating system such as iOS®, ANDROID®, MS-DOS®, MS-WINDOWS®, OS/2®, UNIX®, LINUX®, or another known operating system. In other cases, the I/O controller 1515 may represent or interact with a modem, a keyboard, a mouse, a touchscreen, or a similar device. In some cases, the I/O controller 1515 may be implemented as part of a processor. In some cases, a user may interact with the device 1505 via the I/O controller 1515 or via hardware components controlled by the I/O controller 1515.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM and ROM. The memory 1530 may store computer-readable, computer-executable code 1540 including instructions that, when executed, cause the processor to perform various functions described herein. In some cases, the memory 1530 may contain, among other things, a BIOS which may control basic hardware or software operation such as the interaction with peripheral components or devices.

The processor 1535 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1535 may be configured to operate a memory array using a memory controller. In other cases, a memory controller may be integrated into the processor 1535. The processor 1535 may be configured to execute computer-readable instructions stored in a memory (e.g., the memory 1530) to cause the device 1505 to perform various functions (e.g., functions or tasks supporting SI protection at an NF in the core network).

The code 1540 may include instructions to implement aspects of the present disclosure, including instructions to support wireless communications. The code 1540 may be stored in a non-transitory computer-readable medium such as system memory or other type of memory. In some cases, the code 1540 may not be directly executable by the processor 1535 but may cause a computer (e.g., when compiled and executed) to perform functions described herein.

Figure 16:
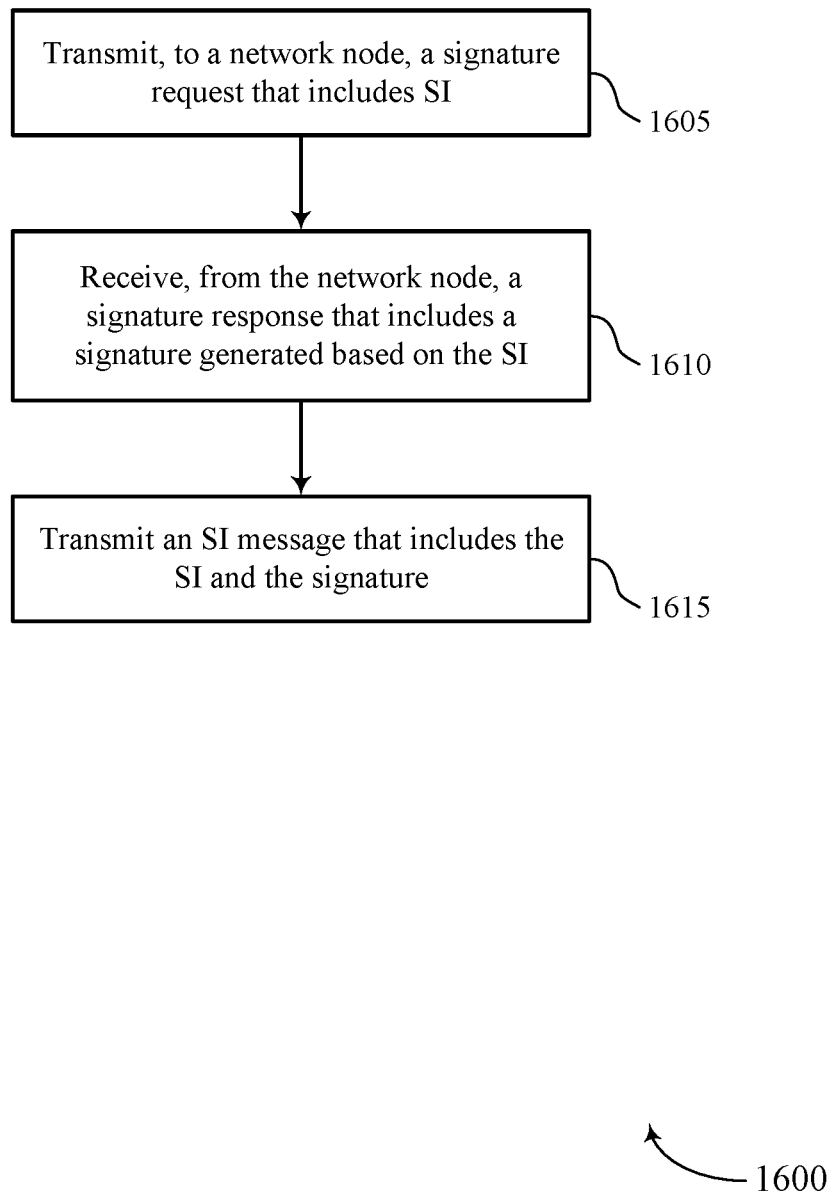
FIGS. 16 through 23 show flowcharts illustrating methods that support SI protection at an NF in the core network in accordance with aspects of the present disclosure.

FIG. 16 shows a flowchart illustrating a method 1600 that supports SI protection at an NF in the core network in accordance with aspects of the present disclosure. The operations of method 1600 may be implemented by a base station 105 or its components as described herein. For example, the operations of method 1600 may be performed by a base station communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1605, the base station may transmit, to a network node, a signature request that includes SI. The operations of 1605 may be performed according to the methods described herein. In some examples, aspects of the operations of 1605 may be performed by a signature request transmitter as described with reference to FIGS. 8 through 11.

At 1610, the base station may receive, from the network node, a signature response that includes a signature generated based on the SI. The operations of 1610 may be performed according to the methods described herein. In some examples, aspects of the operations of 1610 may be performed by a signature response receiver as described with reference to FIGS. 8 through 11.

At 1615, the base station may transmit an SI message that includes the SI and the signature. The operations of 1615 may be performed according to the methods described herein. In some examples, aspects of the operations of 1615 may be performed by an SI message transmitter as described with reference to FIGS. 8 through 11.

Figure 17:
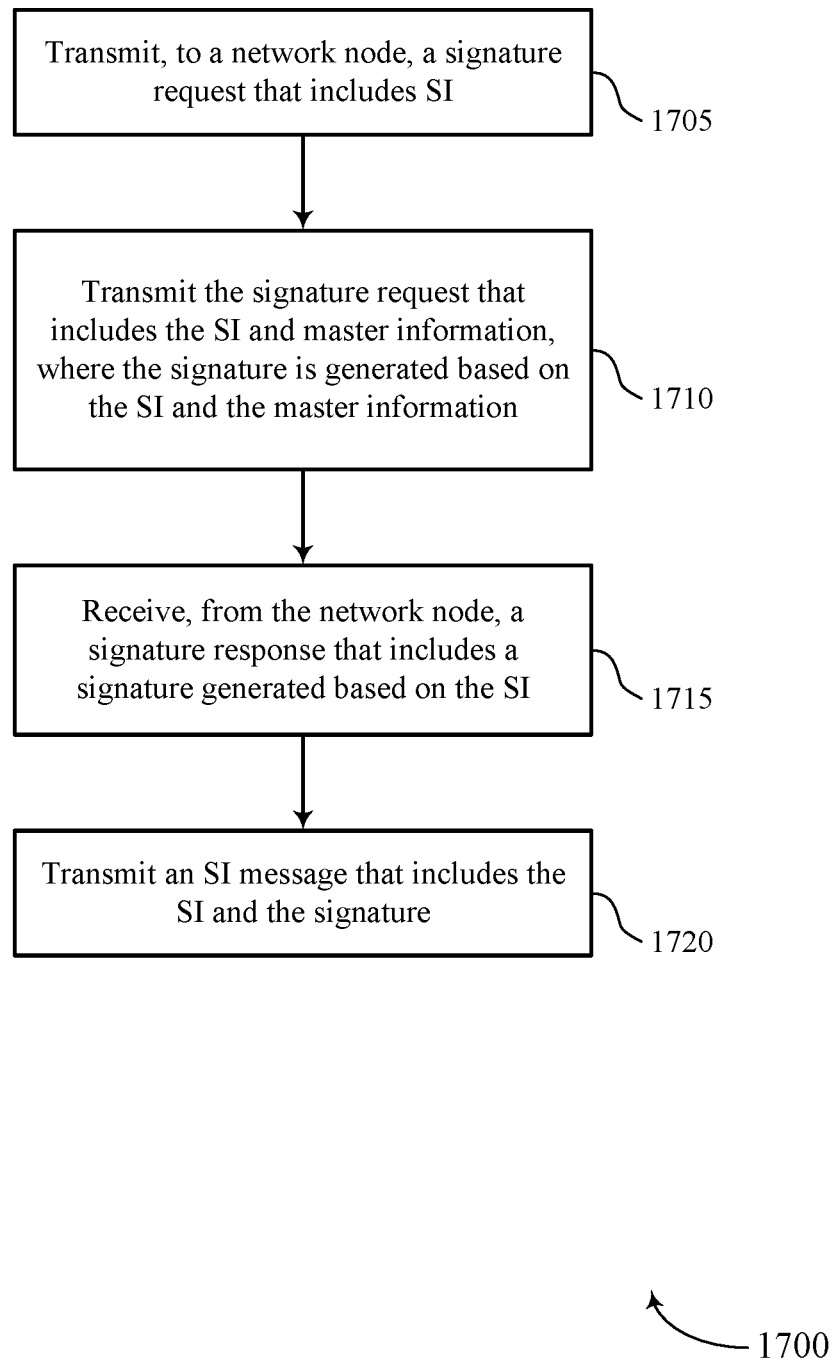

FIG. 17 shows a flowchart illustrating a method 1700 that supports SI protection at an NF in the core network in accordance with aspects of the present disclosure. The operations of method 1700 may be implemented by a base station 105 or its components as described herein. For example, the operations of method 1700 may be performed by a base station communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1705, the base station may transmit, to a network node, a signature request that includes SI. The operations of 1705 may be performed according to the methods described herein. In some examples, aspects of the operations of 1705 may be performed by a signature request transmitter as described with reference to FIGS. 8 through 11.

At 1710, the base station may transmit the signature request that includes the SI and master information, where the signature is generated based on the SI and the master information. The operations of 1710 may be performed according to the methods described herein. In some examples, aspects of the operations of 1710 may be performed by a signature request transmitter as described with reference to FIGS. 8 through 11.

At 1715, the base station may receive, from the network node, a signature response that includes a signature generated based on the SI. The operations of 1715 may be performed according to the methods described herein. In some examples, aspects of the operations of 1715 may be performed by a signature response receiver as described with reference to FIGS. 8 through 11.

At 1720, the base station may transmit an SI message that includes the SI and the signature. The operations of 1720 may be performed according to the methods described herein. In some examples, aspects of the operations of 1720 may be performed by an SI message transmitter as described with reference to FIGS. 8 through 11.

Figure 18:
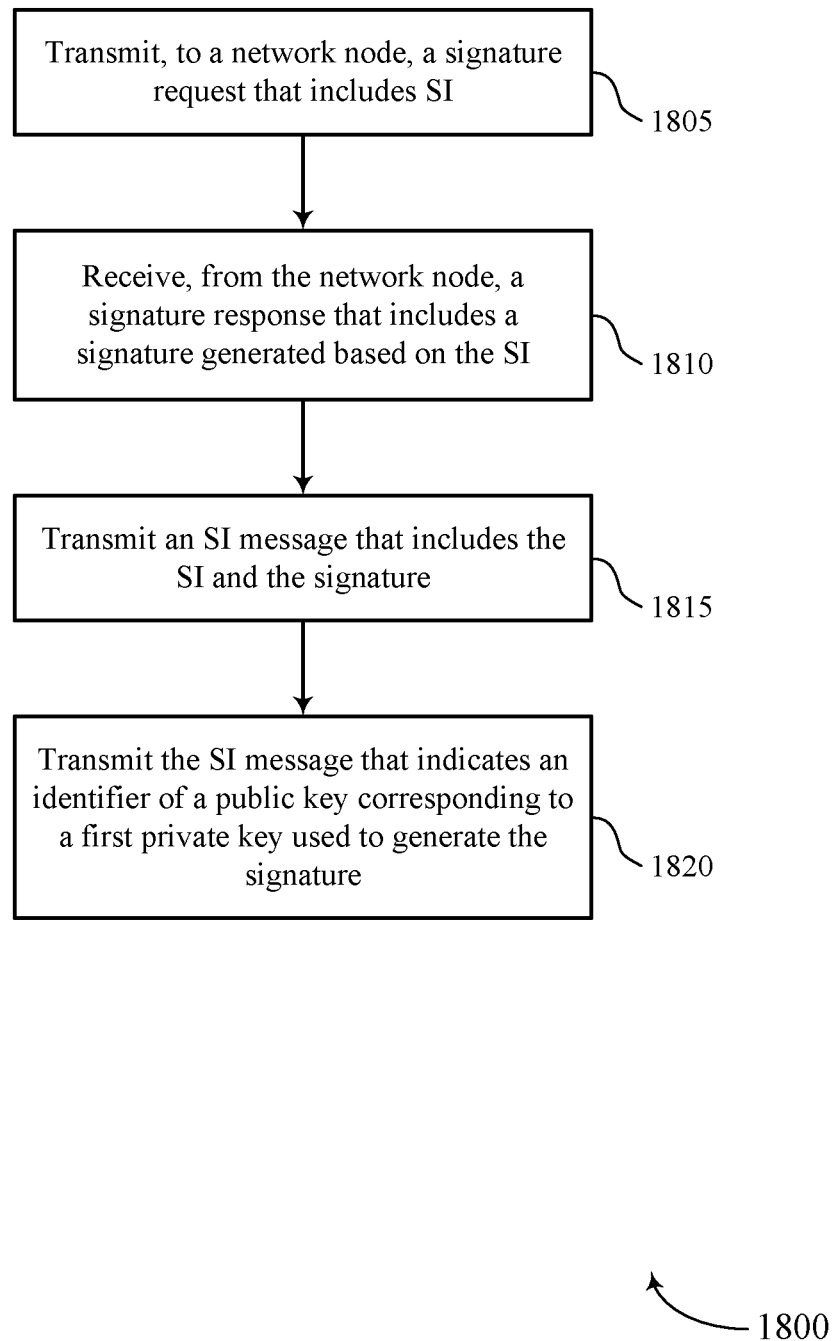

FIG. 18 shows a flowchart illustrating a method 1800 that supports SI protection at an NF in the core network in accordance with aspects of the present disclosure. The operations of method 1800 may be implemented by a base station 105 or its components as described herein. For example, the operations of method 1800 may be performed by a base station communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1805, the base station may transmit, to a network node, a signature request that includes SI. The operations of 1805 may be performed according to the methods described herein. In some examples, aspects of the operations of 1805 may be performed by a signature request transmitter as described with reference to FIGS. 8 through 11.

At 1810, the base station may receive, from the network node, a signature response that includes a signature generated based on the SI. The operations of 1810 may be performed according to the methods described herein. In some examples, aspects of the operations of 1810 may be performed by a signature response receiver as described with reference to FIGS. 8 through 11.

At 1815, the base station may transmit an SI message that includes the SI and the signature. The operations of 1815 may be performed according to the methods described herein. In some examples, aspects of the operations of 1815 may be performed by an SI message transmitter as described with reference to FIGS. 8 through 11.

At 1820, the base station may transmit the SI message that indicates an identifier of a public key corresponding to a first private key used to generate the signature. The operations of 1820 may be performed according to the methods described herein. In some examples, aspects of the operations of 1820 may be performed by an SI message transmitter as described with reference to FIGS. 8 through 11.

Figure 19:
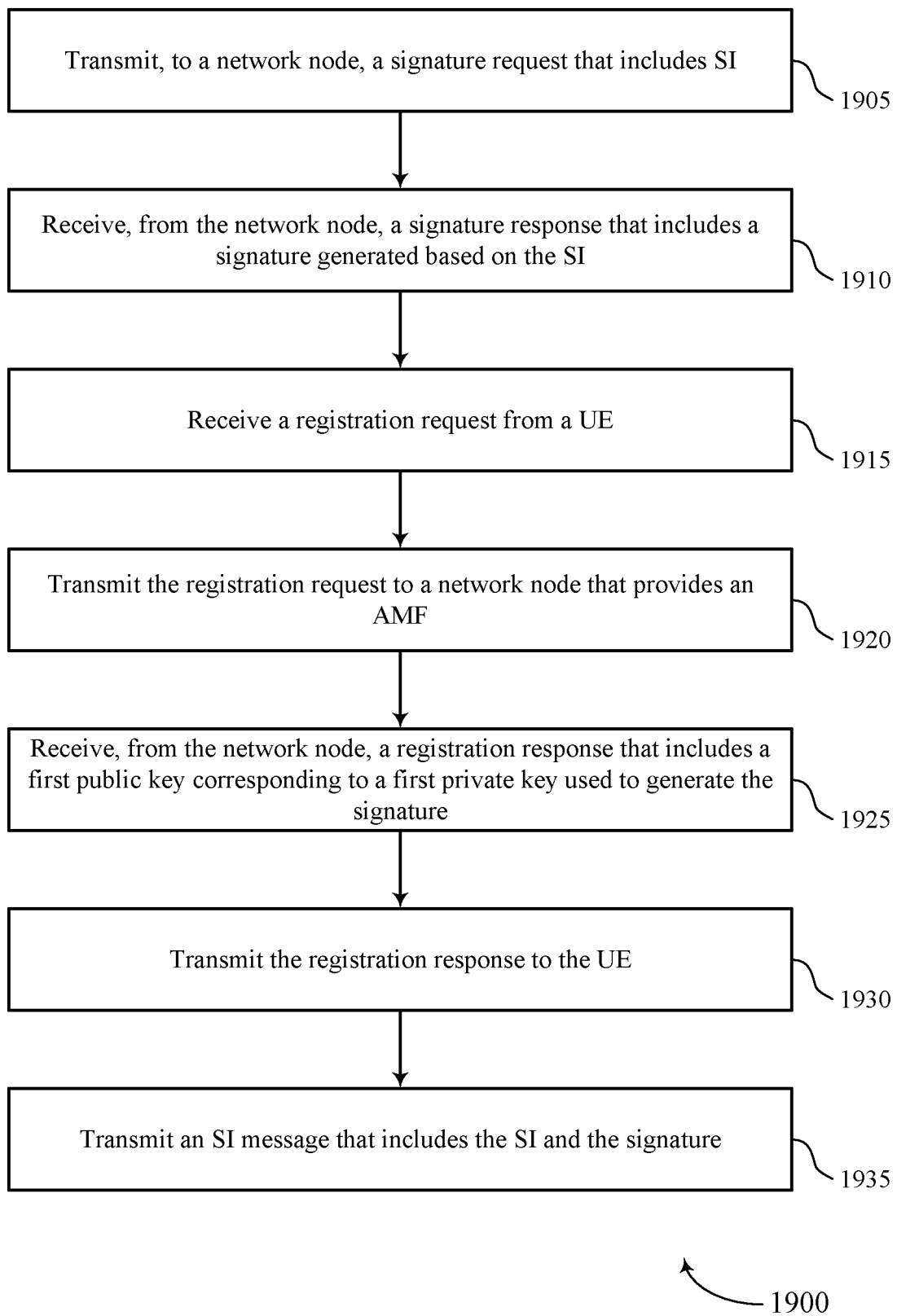

FIG. 19 shows a flowchart illustrating a method 1900 that supports SI protection at an NF in the core network in accordance with aspects of the present disclosure. The operations of method 1900 may be implemented by a base station 105 or its components as described herein. For example, the operations of method 1900 may be performed by a base station communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1905, the base station may transmit, to a network node, a signature request that includes SI. The operations of 1905 may be performed according to the methods described herein. In some examples, aspects of the operations of 1905 may be performed by a signature request transmitter as described with reference to FIGS. 8 through 11.

At 1910, the base station may receive, from the network node, a signature response that includes a signature generated based on the SI. The operations of 1910 may be performed according to the methods described herein. In some examples, aspects of the operations of 1910 may be performed by a signature response receiver as described with reference to FIGS. 8 through 11.

At 1915, the base station may receive a registration request from a UE. The operations of 1915 may be performed according to the methods described herein. In some examples, aspects of the operations of 1915 may be performed by a tracking area component as described with reference to FIGS. 8 through 11.

At 1920, the base station may transmit the registration request to a network node (e.g., a core network node) that provides an access and mobility management function (AMF). The operations of 1920 may be performed according to the methods described herein. In some examples, aspects of the operations of 1920 may be performed by a tracking area component as described with reference to FIGS. 8 through 11.

At 1925, the base station may receive, from the network node, a registration response that includes a first public key corresponding to a first private key used to generate the signature. The operations of 1925 may be performed according to the methods described herein. In some examples, aspects of the operations of 1925 may be performed by a tracking area component as described with reference to FIGS. 8 through 11.

At 1930, the base station may transmit the registration response to the UE. The operations of 1930 may be performed according to the methods described herein. In some examples, aspects of the operations of 1930 may be performed by a tracking area component as described with reference to FIGS. 8 through 11.

At 1935, the base station may transmit an SI message that includes the SI and the signature. The operations of 1935 may be performed according to the methods described herein. In some examples, aspects of the operations of 1935 may be performed by an SI message transmitter as described with reference to FIGS. 8 through 11.

Figure 20:
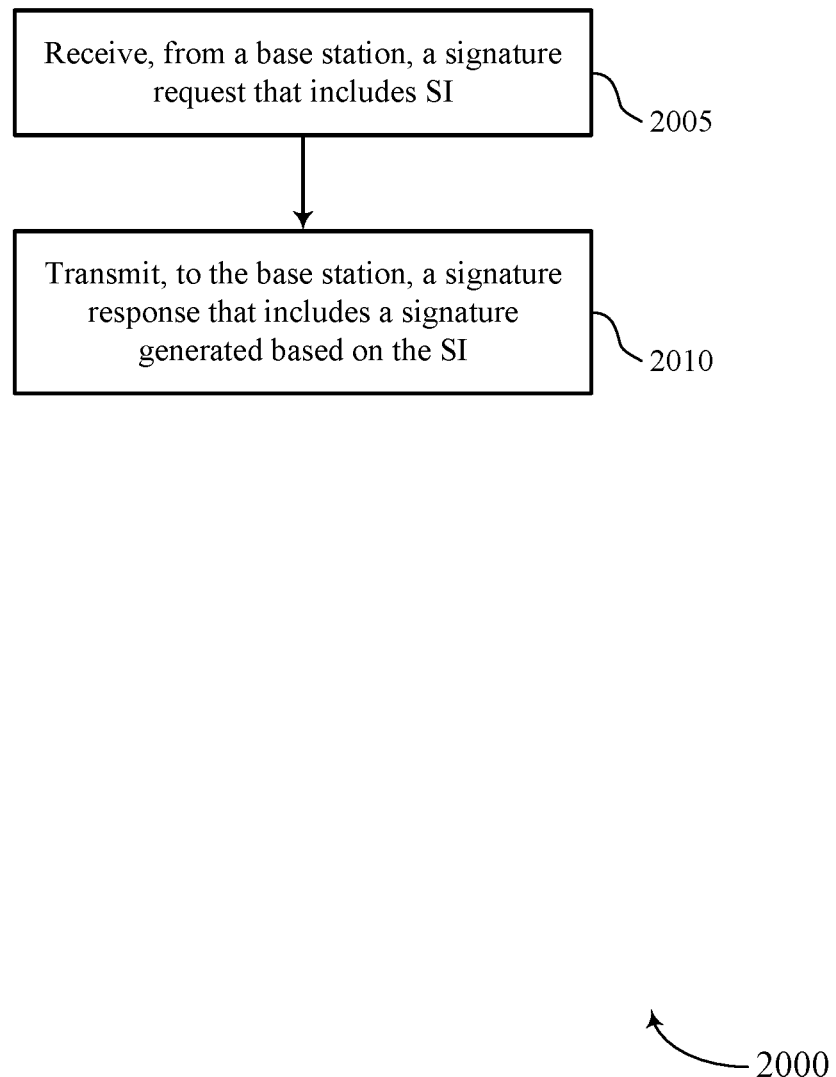

FIG. 20 shows a flowchart illustrating a method 2000 that supports SI protection at an NF in the core network in accordance with aspects of the present disclosure. The operations of method 2000 may be implemented by a network entity or its components as described herein. For example, the operations of method 2000 may be performed by a network communications manager as described with reference to FIGS. 12 through 15. In some examples, a network entity may execute a set of instructions to control the functional elements of the network entity to perform the functions described below. Additionally or alternatively, a network entity may perform aspects of the functions described below using special-purpose hardware.

At 2005, the network entity may receive, from a base station, a signature request that includes SI. The operations of 2005 may be performed according to the methods described herein. In some examples, aspects of the operations of 2005 may be performed by a signature request receiver as described with reference to FIGS. 12 through 15.

At 2010, the network entity may transmit, to the base station, a signature response that includes a signature generated based on the SI. The operations of 2010 may be performed according to the methods described herein. In some examples, aspects of the operations of 2010 may be performed by a signature response transmitter as described with reference to FIGS. 12 through 15.

Figure 21:
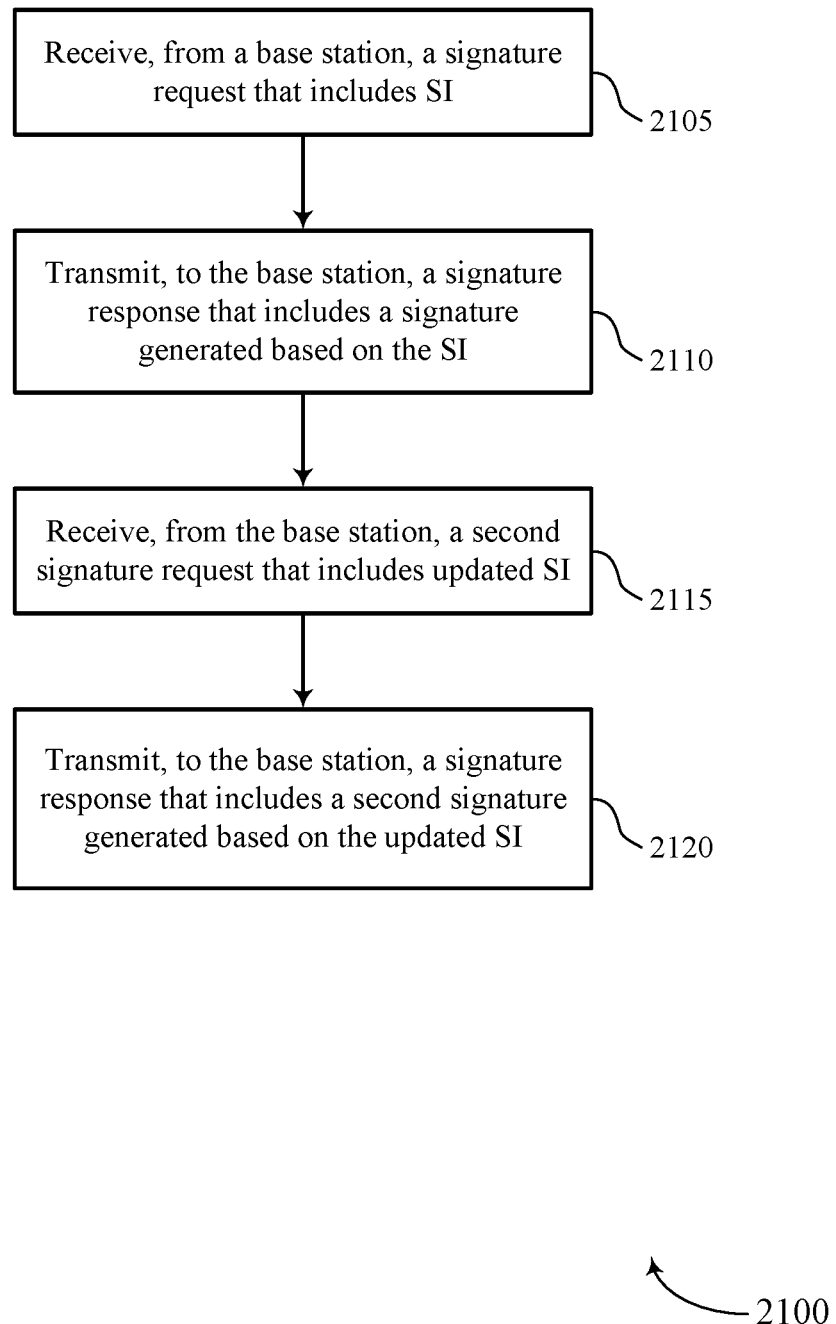

FIG. 21 shows a flowchart illustrating a method 2100 that supports SI protection at an NF in the core network in accordance with aspects of the present disclosure. The operations of method 2100 may be implemented by a network entity or its components as described herein. For example, the operations of method 2100 may be performed by a network communications manager as described with reference to FIGS. 12 through 15. In some examples, a network entity may execute a set of instructions to control the functional elements of the network entity to perform the functions described below. Additionally or alternatively, a network entity may perform aspects of the functions described below using special-purpose hardware.

At 2105, the network entity may receive, from a base station, a signature request that includes SI. The operations of 2105 may be performed according to the methods described herein. In some examples, aspects of the operations of 2105 may be performed by a signature request receiver as described with reference to FIGS. 12 through 15.

At 2110, the network entity may transmit, to the base station, a signature response that includes a signature generated based on the SI. The operations of 2110 may be performed according to the methods described herein. In some examples, aspects of the operations of 2110 may be performed by a signature response transmitter as described with reference to FIGS. 12 through 15.

At 2115, the network entity may receive, from the base station, a second signature request that includes updated SI. The operations of 2115 may be performed according to the methods described herein. In some examples, aspects of the operations of 2115 may be performed by a signature request receiver as described with reference to FIGS. 12 through 15.

At 2120, the network entity may transmit, to the base station, a signature response that includes a second signature generated based on the updated SI. The operations of 2120 may be performed according to the methods described herein. In some examples, aspects of the operations of 2120 may be performed by a signature response transmitter as described with reference to FIGS. 12 through 15.

Figure 22:
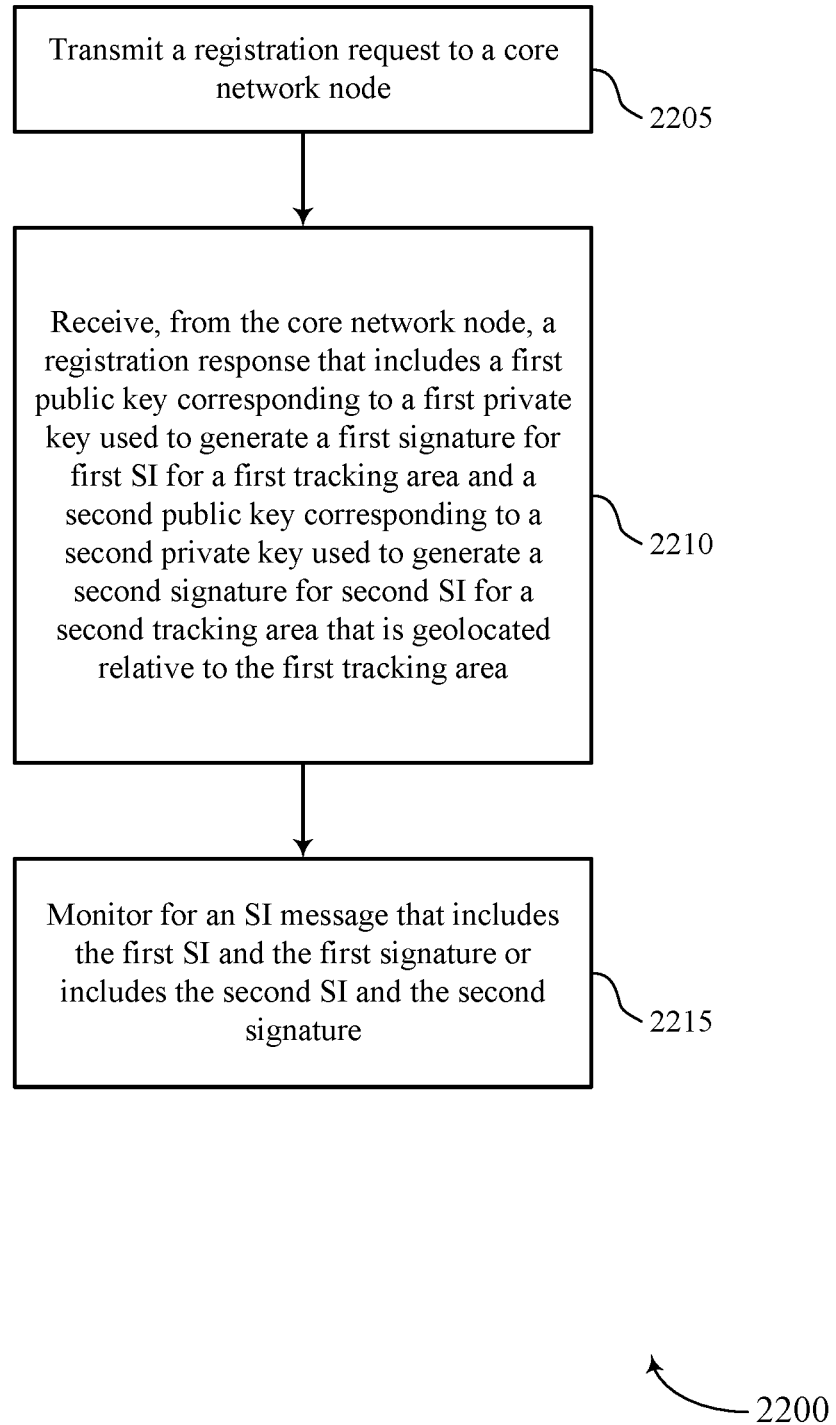

FIG. 22 shows a flowchart illustrating a method 2200 that supports SI protection at an NF in the core network in accordance with aspects of the present disclosure. The operations of method 2200 may be implemented by a UE 115 or its components as described herein. For example, the operations of method 2200 may be performed by a UE communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 2205, the UE may transmit a registration request to a core network node. The operations of 2205 may be performed according to the methods described herein. In some examples, aspects of the operations of 2205 may be performed by a registration request component as described with reference to FIGS. 4 through 7.

At 2210, the UE may receive, from the core network node, a registration response that includes a first public key corresponding to a first private key used to generate a first signature for first SI for a first tracking area and a second public key corresponding to a second private key used to generate a second signature for second SI for a second tracking area that is geolocated relative to the first tracking area. The operations of 2210 may be performed according to the methods described herein. In some examples, aspects of the operations of 2210 may be performed by a registration response component as described with reference to FIGS. 4 through 7.

At 2215, the UE may monitor for an SI message that includes the first SI and the first signature or includes the second SI and the second signature. The operations of 2215 may be performed according to the methods described herein. In some examples, aspects of the operations of 2215 may be performed by an SI message monitoring component as described with reference to FIGS. 4 through 7.

Figure 23:
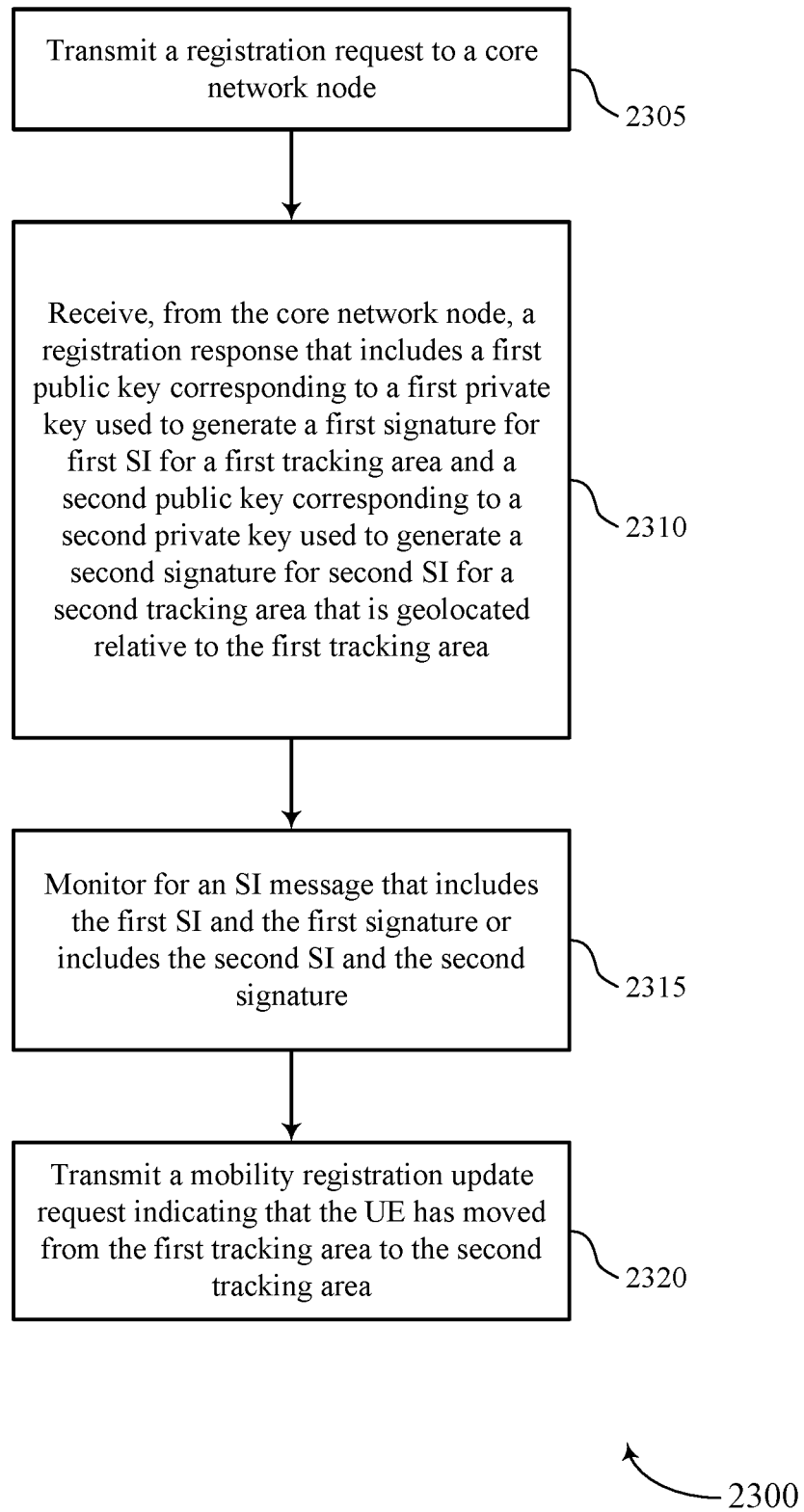

FIG. 23 shows a flowchart illustrating a method 2300 that supports SI protection at an NF in the core network in accordance with aspects of the present disclosure. The operations of method 2300 may be implemented by a UE 115 or its components as described herein. For example, the operations of method 2300 may be performed by a UE communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 2305, the UE may transmit a registration request to a core network node. The operations of 2305 may be performed according to the methods described herein. In some examples, aspects of the operations of 2305 may be performed by a registration request component as described with reference to FIGS. 4 through 7.

At 2310, the UE may receive, from the core network node, a registration response that includes a first public key corresponding to a first private key used to generate a first signature for first SI for a first tracking area and a second public key corresponding to a second private key used to generate a second signature for second SI for a second tracking area that is geolocated relative to the first tracking area. The operations of 2310 may be performed according to the methods described herein. In some examples, aspects of the operations of 2310 may be performed by a registration response component as described with reference to FIGS. 4 through 7.

At 2315, the UE may monitor for an SI message that includes the first SI and the first signature or includes the second SI and the second signature. The operations of 2315 may be performed according to the methods described herein. In some examples, aspects of the operations of 2315 may be performed by an SI message monitoring component as described with reference to FIGS. 4 through 7.

At 2320, the UE may transmit a mobility registration update request indicating that the UE has moved from the first tracking area to the second tracking area. The operations of 2320 may be performed according to the methods described herein. In some examples, aspects of the operations of 2320 may be performed by a registration request component as described with reference to FIGS. 4 through 7.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications by a base station, comprising:

transmitting, from the base station to a network node prior to providing a system information block including system information to a user equipment (UE), a signature request that comprises the system information, wherein the signature request indicates a subframe increment interval and requests a plurality of signatures corresponding to a subframe number range between a beginning subframe number and an ending subframe number;

receiving, by the base station from the network node and in response to the signature request, a plurality of signature responses that each comprise a subset of one or more of the plurality of signatures, wherein each of the subsets corresponds to a respective subframe increment interval within the subframe number range, wherein a first signature response of the plurality of signature responses comprises a first signature of the plurality of signatures that is generated by the network node based on a first private key that is maintained at the network node, the first signature for authenticating the system information, wherein the first private key is not known to the base station and the first signature response further comprises an identifier of a public key corresponding to the first private key used to generate the first signature;
transmitting, from the base station to the UE and in response to receiving the plurality of signature responses including the first signature response, a system information message that comprises the system information block including the system information, the first signature, and the identifier of the public key corresponding to the first private key used to generate the first signature; and
communicating with the UE via a connection established using the system information included in the system information block.

2. The method of claim 1, wherein transmitting the signature request comprises:
transmitting the signature request that comprises the system information and master information, wherein the first signature is generated based at least in part on the system information and the master information.

3. The method of claim 1, further comprising:
transmitting, to the network node, a second signature request that comprises updated system information;
receiving, from the network node, a second signature response that comprises a second signature generated based at least in part on the updated system information; and
transmitting a second system information message that comprises the updated system information and the second signature.

4. A method for wireless communications by a network node, comprising:
receiving, by the network node from a base station prior to a system information block including system information being provided to a user equipment (UE), a signature request that comprises the system information, wherein the signature request indicates a subframe increment interval and requests a plurality of signatures corresponding to a subframe number range between a beginning subframe number and an ending subframe number; and
transmitting, from the network node to the base station and in response to the signature request, a plurality of signature responses that each comprise a subset of one or more of the plurality of signatures, wherein each of the subsets corresponds to a respective subframe increment interval within the subframe number range, wherein a first signature response of the plurality of signature responses comprises a first signature of the plurality of signatures that is generated by the network node based on a first private key that is maintained at the network node, the first signature for authenticating the system information, wherein the first private key is not known to the base station and the first signature response further comprises an identifier of a public key corresponding to the first private key used to generate the first signature,
wherein receiving the signature request comprises receiving the signature request that comprises the system information and master information, wherein the first signature is generated based at least in part on the system information and the master information.

5. The method of claim 4, further comprising:
receiving, from the base station, a second signature request that comprises updated system information; and
transmitting, to the base station, a second signature response that comprises a second signature generated based at least in part on the updated system information.

6. An apparatus for wireless communications by a base station, comprising:
one or more processors;
one or more memories coupled with the one or more processors; and
instructions stored in the one or more memories and executable by the one or more processors to cause the apparatus to:
transmit, from the base station to a network node prior to providing a system information block including system information to a user equipment (UE), a signature request that comprises the system information, wherein the signature request indicates a subframe increment interval and requests a plurality of signatures corresponding to a subframe number range between a beginning subframe number and an ending subframe number;
receive, by the base station from the network node and in response to the signature request, a plurality of signature responses that each comprise a subset of one or more of the plurality of signatures, wherein each of the subsets corresponds to a respective subframe increment interval within the subframe number range, wherein a first signature response of the plurality of signature responses comprises a first signature of the plurality of signatures that is generated by the network node based on a first private key that is maintained at the network node, the first signature for authenticating the system information, wherein the first private key is not known to the base station and the first signature response further comprises an identifier of a public key corresponding to the first private key used to generate the first signature;
transmit, from the base station to the UE and in response to receiving the plurality of signature responses including the first signature response, a system information message that comprises the system information block including the system information, the first signature, and the identifier of the public key corresponding to the first private key used to generate the first signature; and
communicate with the UE via a connection established using the system information included in the system information block.

7. The apparatus of claim 6, wherein, to transmit the signature request, the instructions are further executable by the one or more processors to cause the apparatus to:
transmit the signature request that comprises the system information and master information, wherein the first signature is based at least in part on the system information and the master information.

8. The apparatus of claim 6, wherein the instructions are further executable by the one or more processors to cause the apparatus to:
transmitting, to the network node, a second signature request that comprises updated system information;
receiving, from the network node, a second signature response that comprises a second signature that is based at least in part on the updated system information; and transmitting a second system information message that comprises the updated system information and the second signature.

* * * * *